United States Patent
Moon et al.

(10) Patent No.: US 9,414,335 B2
(45) Date of Patent: Aug. 9, 2016

(54) METHOD AND APPARATUS FOR TRANSMITTING UPLINK SIGNAL OR UPLINK CHANNEL

(71) Applicant: Electronics and Telecommunications Research Institute, Daejeon (KR)

(72) Inventors: Sung-Hyun Moon, Daejeon (KR); Young Jo Ko, Daejeon (KR); Cheulsoon Kim, Daejeon (KR); Joonwoo Shin, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/615,970

(22) Filed: Feb. 6, 2015

(65) Prior Publication Data

US 2015/0223213 A1    Aug. 6, 2015

(30) Foreign Application Priority Data

Feb. 6, 2014 (KR) .................. 10-2014-0013836
May 28, 2014 (KR) .................. 10-2014-0064667
Jan. 27, 2015 (KR) .................. 10-2015-0013053

(51) Int. Cl.
  *H04W 52/54* (2009.01)
  *H04L 5/00* (2006.01)
  *H04W 52/32* (2009.01)
  *H04W 52/34* (2009.01)
  *H04W 52/40* (2009.01)
  *H04W 72/12* (2009.01)

(52) U.S. Cl.
  CPC ............. *H04W 52/54* (2013.01); *H04L 5/0048* (2013.01); *H04W 52/325* (2013.01); *H04W 52/34* (2013.01); *H04W 52/40* (2013.01); *H04W 72/1289* (2013.01)

(58) Field of Classification Search
  CPC ... H04W 72/042; H04W 52/54; H04L 5/0048
  See application file for complete search history.

(56) References Cited

U.S. PATENT DOCUMENTS

| 8,401,542 B2 * | 3/2013 | Chung et al. .................. 455/423 |
| 8,498,662 B2 | 7/2013 | Kim et al. |
| 8,743,720 B2 | 6/2014 | Lee et al. |
| 8,855,132 B2 * | 10/2014 | Lohr et al. ..................... 370/431 |

(Continued)

FOREIGN PATENT DOCUMENTS

WO         2014038908 A1       3/2014

OTHER PUBLICATIONS

3rd Generation Partnership Project;Technical Specification Group Radio Access Network; Evolved Universal Terrestrial Radio Access (E-UTRA); Study on Small Cell Enhancements for E-UTRA and E-UTRAN—Higher layer aspects, Nov. 2013, 3GPP TR 36.842, pp. 1-69, Valbonne, France.

(Continued)

*Primary Examiner* — Curtis A Alia
(74) *Attorney, Agent, or Firm* — William Park & Associates Ltd.

(57) ABSTRACT

A method for transmitting a sounding reference signal (SRS) by a terminal in an environment in which a first carrier corresponding to a first serving cell and a second carrier corresponding to a second serving cell are aggregated is provided. The terminal receives first downlink control information (DCI) which is used for downlink scheduling and includes a first transmit power control (TPC) command through the first serving cell. The terminal controls transmit power of the SRS based on the first TPC command for transmit power control of the SRS. Next, the terminal transmits the SRS through the second serving cell using the controlled transmit power.

17 Claims, 11 Drawing Sheets

(56) References Cited

U.S. PATENT DOCUMENTS

| | | | |
|---|---|---|---|
| 2010/0111107 A1* | 5/2010 | Han et al. | 370/472 |
| 2011/0081939 A1* | 4/2011 | Damnjanovic | H04W 52/08 455/522 |
| 2012/0275395 A1* | 11/2012 | Gerstenberger et al. | 370/329 |
| 2013/0039286 A1* | 2/2013 | Larsson et al. | 370/329 |
| 2013/0136006 A1 | 5/2013 | Kim et al. | |
| 2013/0215875 A1* | 8/2013 | Yang et al. | 370/336 |
| 2014/0078941 A1* | 3/2014 | Seo et al. | 370/280 |

OTHER PUBLICATIONS

3rd Generation Partnership Project;Technical Specification Group Radio Access Network; Evolved Universal Terrestrial Radio Access (E-UTRA); Physical channels and modulation, Dec. 2012, pp. 1-108,3GPP TS 36.211, Valbonne, France.

3rd Generation Partnership Project; Technical Specification Group Radio Access Network; Evolved Universal Terrestrial Radio Access (E-UTRA); Multiplexing and channel coding, Dec. 2012, pp. 1-82, 3GPP TS 36.212, Valbonne, France.

3rd Generation Partnership Project; Technical Specification Group Radio Access Network; Evolved Universal Terrestrial Radio Access (E-UTRA); Physical layer procedures, Dec. 2013, pp. 1-182, 3GPP TS 36.213, Valbonne, France.

3rd Generation Partnership Project; Technical Specification Group Radio Access Network; Evolved Universal Terrestrial Radio Access (E-UTRA); Physical layer; Measurements, Dec. 2012, pp. 1-14, 3GPP TS 36.214, Valbonne, France.

* cited by examiner (A)

(B)

METHOD AND APPARATUS FOR TRANSMITTING UPLINK SIGNAL OR UPLINK CHANNEL

CROSS-REFERENCE TO RELATED APPLICATION

This application claims priority to and the benefit of Korean Patent Application Nos. 10-2014-0013836, 2014-0064667, and 10-2015-0013053 filed in the Korean Intellectual Property Office on Feb. 6, 2014, May 28, 2014, and Jan. 27, 2015, the entire contents of which are incorporated herein by reference.

BACKGROUND OF THE INVENTION (a) Field of the Invention

The present invention relates to a method and an apparatus for transmitting a sounding reference signal (SRS) which is an uplink signal, or a physical uplink control channel (PUCCH) and a physical uplink shared channel (PUSCH) being an uplink channel.

(b) Description of the Related Art

In an existing long term evolution (LTE) single carrier system, only one carrier is allocated to uplink and downlink of a terminal. Meanwhile, in a carrier aggregation (CA) system, a plurality of uplink carriers or a plurality of downlink carriers may be allocated to the terminal. In this case, the number of uplink carriers may be different from the number of downlink carriers. Further, linkage between the uplink carrier and the downlink carrier is indicated by a parameter ul-CarrierFreq included in system information (SIB2: System Information Block type 2) of a type 2.

The carrier allocated to the terminal may be divided into a primary cell or a secondary cell. The primary cell means a cell which is indicated as a cell firstly performing a radio resource control (RRC) connection establishment process with a base station by a terminal, or a target cell by a serving cell in a handover process to obtain new RRC connection.

The secondary cell means a cell which is additionally set to provide an additional radio resource to the terminal after RRC connection is established through a primary cell. In the carrier aggregation system, a base station manages a secondary cell by terminals according to a measurement report, or uplink or downlink traffic of the terminal. The secondary cell may be added or removed through RRC signaling. An activation or deactivation operation may be indicated through a medium access control (MAC) control element (CE) with respect to the secondary cell in which RRC connection is established.

Meanwhile, there is a need for a technology of controlling uplink power in the LTE carrier aggregation system.

SUMMARY OF THE INVENTION

The present invention has been made in an effort to provide a method and an apparatus for transmitting a sounding reference signal or a physical uplink control channel having advantages of efficiently controlling uplink power in an LTE carrier aggregation system. An exemplary embodiment of the present invention provides a method for transmitting a sounding reference signal (SRS) by a terminal in an environment in which a first carrier corresponding to a first serving cell and a second carrier corresponding to a second serving cell are aggregated. The method for transmitting the SRS includes: receiving first downlink control information (DCI) which is used for downlink scheduling and includes a first transmit power control (TPC) command through the first serving cell; controlling transmit power of the SRS based on the first TPC command for transmit power control of the SRS; and transmitting the SRS through the second serving cell using the controlled transmit power.

The second serving cell may include a secondary cell using time division duplexing (TDD) for the terminal.

One radio frame for the second serving cell may include only a plurality of downlink sub-frames and at least one special sub-frame The special sub-frame may include a downlink pilot time slot, a guard period, and an uplink pilot time slot, and may have one of a 5 ms periodicity and a 10 ms periodicity.

The first DCI may include all fields that one of a DCI format 1, a DCI format 1A, a DCI format 1B, a DCI format 1D, a DCI format 2, a DCI format 2A, a DCI format 2B, a DCI format 2C, and a DCI format 2D defined for a Long Term Evolution (LTE) system or a LTE Advanced (LTE-A) system has, and may further include a field for the first TPC command having two bits.

The controlling of the transmit power of the SRS may include controlling transmit power of the SRS based on the first TPC command of the first DCI received from at least a fourth downlink sub-frame before a first special sub-frame in which the SRS is transmitted among the special sub-frames.

The receiving of the first DCI may include receiving the first DCI within a first sub-frame group defined for receiving the first DCI.

The controlling of the transmit power of the SRS may include controlling transmit power of the SRS based on the first TPC command of the first DCI which is finally received among the first DCIs received within the first sub-frame group.

The receiving of the first DCI may include receiving the first DCI within a first sub-frame group defined for receiving the first DCI.

The controlling of the transmit power of the SRS may include: accumulating power control values corresponding to the first TPC command of the first DCI received within the first sub-frame group, respectively; and controlling transmit power of the SRS based on the accumulated power control values.

The method for transmitting the SRS may further include receiving a second DCI for an uplink TPC through a first serving cell serving as a primary cell for the terminal.

The second DCI may include a plurality of second TPC commands for a physical uplink shared channel (PUSCH) that one of a DCI format 3 and a DCI format 3A defined for a LTE system or a LTE-A system has, and further includes a carrier indicator (CI) indicating a cell to which the second TPC command is applied.

The method for transmitting the SRS may include: determining a third TPC command for the terminal among the plurality of second TPC commands included in the second DCI; and controlling transmit power of the SRS to be transmitted through the second serving cell based on the third TPC command when the CI included in the second DCI indicates the second serving cell which is a secondary cell for the terminal.

The third TPC command may be one of 2 bits and 1 bit.

The CI may be 3 bits, and may be located before the plurality of second TPC commands.

Another embodiment of the present invention provides a method for transmitting a sounding reference signal (SRS) by a terminal in an environment in which a first carrier corresponding to a first serving cell and a second carrier corresponding to a second serving cell are aggregated. The method for transmitting the SRS includes: receiving first downlink control information (DCI) for uplink transmit power control (TPC) through the first serving cell which is a primary cell for the terminal; controlling transmit power of the SRS to be transmitted through the second serving cell based on a second TPC command for the terminal among a plurality of first TPC commands included in the first DCI when a carrier indicator (CI) included in the first DCI represents the second serving cell which is a secondary cell for the terminal; and transmitting the SRS to the second serving cell using the controlled transmit power of the SRS.

The CI may be located before or after the plurality of first TPC commands.

The CI may be located before the plurality of first TPC commands and each of the first TPC commands is 2 bits, and the first DCI may further include a padding bit between the CI and the plurality of first TPC commands according to whether the number of bits constituting the CI is an odd number.

A payload size of the first DCI may be equal to a payload size of one of a DCI format 3 and a DCI format 3A defined for a LTE system or a LTE-A system.

The receiving of the first DCI may include receiving the first DCI through a first common search space (CSS) for the first serving cell The number of control channel elements (CCE) that the first CSS occupies may be greater than 16, and may be a multiple of 4 or 8

A payload size of the first DCI may be equal to a payload size of a DCI format 10 defined for a LTE system or a LTE-A system.

The receiving of the first DCI may include receiving the first DCI through a first common search space (CSS) for the first serving cell An aggregation level for the first CSS may be 2.

The method for transmitting the SRS may further include: receiving a second DCI for an uplink TPC through a first common search space (CSS) set to a physical downlink control channel (PDCCH) of the second serving cell; and controlling transmit power of the SRS to be transmitted through the second serving cell based on a fourth TPC command for the terminal among a plurality of third TPC commands included in the second DCI.

The number of control channel elements (CSS) for the first CSS may be 8.

The number of PDCCH candidates for the first CSS may be 2 when an aggregation level is 4, and the number of PDCCH candidates for the first CSS may be 1 when the aggregation level is 8.

Yet another embodiment of the present invention provides a method for transmitting a physical uplink control channel (PUCCH) by a terminal in an environment in which a first carrier corresponding to a first serving cell and a second carrier corresponding to a second serving cell are aggregated. The method for transmitting the PUCCH includes: receiving first downlink control information (DCI) for downlink scheduling through the second serving cell which is a secondary cell for the terminal; controlling transmit power of the PUCCH based on a first TPC command for transmit power control (TPC) of the PUCCH included in the first DCI; and transmitting the PUCCH to the second serving cell using the controlled transmit power of the PUCCH when the second serving cell among cells included in a first cell group is set as a cell through which the PUCCH is transmitted.

The method for transmitting the PUCCH may further include: receiving a second DCI for an uplink TPC; and controlling transmit power of the PUCCH based on a third TPC command for the terminal among a plurality of second TPC commands included in the second DCI when a carrier indicator (CI) included in the second DCI represents the second serving cell.

The method for transmitting the PUCCH may further include: receiving a second DCI for an uplink TPC through a first common search space (CSS) set to a physical downlink control channel (PDCCH) of the second serving cell; and controlling transmit power of the PUCCH based on a third TPC command for the terminal among a plurality of second TPC commands included in the second DCI.

DETAILED DESCRIPTION OF THE EMBODIMENTS

Figure 1:
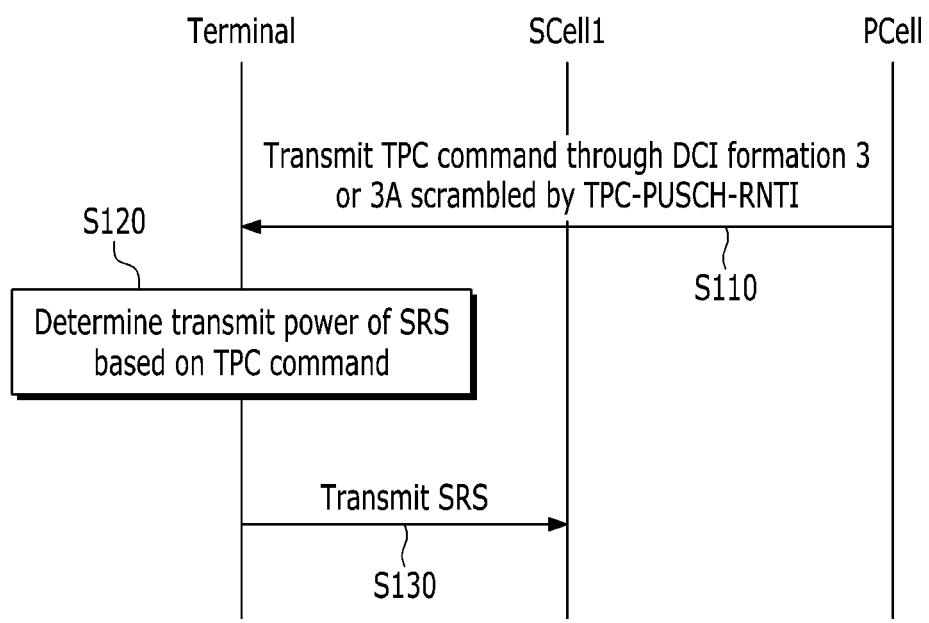
FIG. 1 is a diagram illustrating a method of controlling transmit power of an SRS through a DCI format 3/3A by a terminal and a serving cell.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may perform all or some of functions of the terminal, the MT, the MS, the AMS, the HR-MS, the SS, the PSS, the AT, and the UE.

Further, a base station (BS) may refer to an advanced base station (ABS), a high reliability base station (HR-BS), a node B (nodeB), an evolved node B (eNodeB), an access point (AP), a wireless radio access station (RAS), a transmitting/receiving base station (base transceiver station, BTS), an MMR (mobile multihop relay)-BS, a repeater (relay station, RS) serving as the base station, a high reliability repeater (high reliability relay station, HR-RS) serving as the base station, a small base station, and a macro base station, and may perform all or some of functions of the BS, the ABS, the HR-BS, the nodeB, the eNodeB, the AP, the RAS, the BTS, the MMR-BS, the RS, the HR-RS, the small base station, and the macro base station.

1. Carrier Aggregation System

A carrier aggregation technology of a LTE system and a frame structure in a time division duplex (TDD) mode and an operation scheme thereof will be described.

1.1. Carrier Aggregation Technology

The LTE carrier aggregation system supports cross carrier scheduling. The cross carrier scheduling is a scheduling method of transmitting control information for Physical Downlink Shared Channel (PDSCH) and Physical Uplink Shared Channel (PUSCH) resource allocation of a certain serving cell on a Physical Downlink Control Channel (PDCCH) to a different serving cell from a corresponding cell. The cross carrier scheduling may be set by upper layer signaling a parameter cif-Presence with respect to each serving cell of the terminal. When the cross carrier scheduling is set to a certain serving cell, there is a need for an indicator to indicate through which cell PDSCH or PUSCH (or PDCCH order for noncompetitive-based random access indication) indicated by downlink control information (DCI) transmitted through a PDCCH of a corresponding cell is transmitted. The indicator represents a carrier indicator (CI), and a field for the CI represents a CI field (CIF). The CIF may be included in a DCI format 1/1A/1B/1D/2/2A/2B/2C/2D, or a DCI format 0/4. If cif-Presence=1 with respect to a specific cell, the terminal determines that a CIF is included in a received DCI format. If cif-Presence=0 with respect to the specific cell, the terminal determines that the CIF is not included in the received DCI format.

Meanwhile, the primary cell may not be designated as a cell for exceptionally receiving cross carrier scheduling. That is, resource allocation information of the primary cell is substantially transmitted through a PDCCH of a primary cell.

1.2. New TDD Uplink-Downlink Configuration

In accordance with a current LTE or LTE-Advanced (A) standard, one of a total of 7 UL (Uplink)-DL (Downlink) configurations may be set to a frame structure of the LTE TDD system. A following Table 1 represents a sub-frame configuration in one radio frame by TDD UL-DL configurations.

TABLE 1

| | | \multicolumn{10}{c}{TDD UL-DL configurations} |
|---|---|---|---|---|---|---|---|---|---|---|---|
| TDD UL-DL configuration | DL-to-UL Switch-point periodicity | \multicolumn{10}{c}{Sub-frame number} |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, the 'D' represents a downlink sub-frame, the 'U' represents an uplink sub-frame, and the 'S' represents a special sub-frame. The special sub-frame has a periodicity of 5 ms in TDD UL-DL configurations 0, 1, 2, and 6, and has a periodicity of 10 ms in TDD UL-DL configurations 3, 4, and 5. The special sub-frame is located between a downlink sub-frame and an uplink sub-frame, and includes a downlink pilot time slot (DwPTS), a guard period (GP), and an uplink pilot time slot (UpPTS). The DwPTS is used in cell search, synchronization, or channel estimation. The GP is a period for removing interference generated in uplink of the base station due to a multipath delay difference of terminals. A Physical Random Access Channel (PRACH) or a Sounding Reference Signal (SRS) may be transmitted at the UpPTS period. The PDSCH may be transmitted at the DwPTS period.

Meanwhile, in order to further maximize downlink capacity of the TDD cell, at least one may be selected TDD UL-DL configurations 7, 8, and 9 represented in the following Table 2.

TABLE 2

| | | \multicolumn{10}{c}{New TDD UL-DL configuration} |
|---|---|---|---|---|---|---|---|---|---|---|---|
| TDD UL-DL configuration | DL-to-UL Switch-point periodicity | \multicolumn{10}{c}{Sub-frame number} |
| | | 0 | 1 | 2 | 3 | 4 | 5 | 6 | 7 | 8 | 9 |
| 7 | 5 ms | D | S | D | D | D | D | S | D | D | D |
| 8 | 10 ms | D | S | D | D | D | D | D | D | D | D |
| 9 | — | D | D | D | D | D | D | D | D | D | D |

In the UL-DL configuration 9, one radio frame includes only 10 downlink sub-frames. Accordingly, there is no uplink transmission period in the UL-DL configuration 9. In contrast, in UL-DL configurations 7 and 8, one radio frame includes at least one special sub-frame (5 ms periodicity or 10 ms periodicity) in addition to the downlink sub-frame. A random access preamble or an SRS may be transmitted at an UpPTS period of the special sub-frame. Accordingly, the UL-DL configurations 7 and 8 have a characteristic in that the base station may perform downlink channel estimation according to channel reciprocity using the SRS. Hereinafter, for convenience of description, the TDD UL-DL configuration 7, 8, or 9 defined in Table 2 refers to a downlink dedicated UL-DL configuration.

Rather than the TDD cell (hereinafter referred to as 'first TDD cell') set as a TDD UL-DL configuration in the Table 1, a TDD cell (hereinafter referred to as 'second TDD cell') set as the downlink dedicated UL-DL may be independently operated as a primary cell. When a frequency division duplex (FDD) cell or the first TDD cell serves as the primary cell, the second TDD cell may be used together as the secondary cell through carrier aggregation. In this case, two types of scenarios (first scenario, second scenario) may be considered. In the first scenario, a UL-DL configuration set through SIB1 (system information of type 1, System Information Block type 1) of the TDD cell may be a downlink dedicated UL-DL configuration. In the second scenario, when the TDD cell performs an Enhanced Interference Mitigation & Traffic Adaptation (eIMTA) operation, a UL-DL configuration set through the SIB1 is one of UL-DL configurations 0 to 6. A UL-DL configuration reset according to a reconfiguration DCI may be a downlink dedicated UL-DL configuration. In this case, a reconfiguration DCI represents a DCI for resetting the UL-DL configuration. A cyclic redundancy check (CRC) of the reconfiguration DCI is scrambled by a Radio Network Temporary Identifier (eIMTA-RNTI).

Only a terminal capable of receiving setting of a downlink dedicated UL-DL configuration may be RRC connected to a TDD cell of the first scenario. A terminal capable of receiving setting of a downlink dedicated UL-DL configuration and a legacy terminal not capable of receiving setting of a downlink dedicated UL-DL configuration may be simultaneously RRC connected to a TDD cell of the second scenario. Since there is no uplink sub-frame in a UL-DL configuration set through SIB1 in the first scenario or in a UL-DL configuration reset according to a reconfiguration DCI in the second scenario, a terminal in an RRC idle state may not attempt RRC connection to a corresponding cell (second TDD cell). Accordingly, in order to prevent the terminal from camping on a corresponding cell (second TDD cell), there may be a need for barring access to a corresponding cell by the terminal in the RRC idle state.

1.3. Uplink Power Control

Hereinafter, a signaling method of a TPC command for uplink transmit power control (TPC) will be described.

The TPC command may be divided into a TPC command for PUCCH power control and a TPC command for PUSCH power control. The TPC command for PUCCH power control may be transmitted through a downlink DCI format 1/1A/1B/1D/2/2A/2B/2C/2D or a DCI format 3/3A with respect to a primary cell. In this case, the DCI format is defined in an LTE or LTE-A standard (hereinafter, 'LTE or LTE-A standard' refers to 'LTE standard') as listed in the following Table 3. The DCI format 1/1A/1B/1C/1D/2/2A/2B/2C/2D is for transmitting downlink scheduling or common control information, the DCI format 0/4 is for uplink scheduling, and the DCI format 3/3A is for uplink power control. The control information includes a paging message, system information, random access response, and the like, and may be transmitted through the DCI format 1A/1C.

TABLE 3

| DCI format | Remarks |
| --- | --- |
| Format 0 | Used for scheduling of PUSCH (uplink grant). |
| Format 1 | Used for scheduling a PDSCH codeword. Only a single transport block can be scheduled here using resource allocation type-0/type-1. |
| Format 1A | Used for scheduling a PDSCH codeword. Only a single transport block can be scheduled here using resource allocation type2 (localized or distribtued). |
| Format 1B | Used for scheduling a PDSCH codeword with Rank-1 assignment. |
| Format 1C | Used for very compact scheduling of a PDSCH codeword. A single transport block can be scheduled using resource allocation type2 (always distributed). |

TABLE 3-continued

| DCI format | Remarks |
| --- | --- |
| Format 1D | Used for scheduling multi-user MIMO cases. |
| Format 2 | Used for scheduling of PDSCH in closed loop spatial multiplexing. PDSCH assignments for closed-loop MIMO operation |
| Format 2A | Used for scheduling of PDSCH in open loop spatial multiplexing. PDSCH assignments for open-loop MIMO operation |
| Format 2B | PDSCH assignments for dual-layer beamforming. |
| Format 2C | Used for signaling resource assignments for PDSCH transmissions using closed-loop single-user or multi-user MIMO with up to eight layers. |
| Format 2D | Used for CoMP (Coordinate Multi-Point) operations in conjunction with transmission mode 10. |
| Format 3 | Used for uplink transmit power control with 2 bit power adjustment. |
| Format 3A | Used for uplink transmit power control with 1 bit power adjustment. |
| Format 4 | Used or signaling resource grants for PUSCH when the UE is configured in PUSCH transmission mode 2 for uplink single-user MIMO. |

According to the current LTE standard, since the PUCCH may be transmitted only through a primary cell of the terminal, a TPC command included in a DCI format 1/1A/1B/1D/2/2A/2B/2C/2D with respect to a secondary cell of the terminal may be used for a purpose different from PUCCH power control, that is, for a purpose of resource allocation of a PUCCH format 1a with channel selection or a PUCCH format 3. In this case, the PUCCH format 1 a and the PUCCH format 3 are defined in the LTE standard. The TPC command for PUSCH power control may be transmitted through an uplink DCI format 0/4 or DCI format 3/3A with respect to a serving cell (PUSCH power control target).

As described above, the DCI format 3/3A may be used for PUCCH or PUSCH power control. In a case of the PUCCH, a CRC is scrambled by a TPC-PUCCH-RNTI (CRC scrambled by TPC-PUCCH-RNTI). In a case of the PUSCH, the CRC is scrambled by a TPC-PUSCH-RNTI (CRC scrambled by TPC-PUSCH-RNTI). Since a TPC-PUCCH-RNTI value and a TPC-PUSCH-RNTI value are allocated to the same RNTI value region, discrimination may be difficult by an allocated value itself. However, the TPC-PUCCH-RNTI value and the TPC-PUSCH-RNTI value are RRC signaled so that the terminal may distinguish the TPC-PUCCH-RNTI from the TPC-PUSCH-RNTI. The DCI format 3 includes at least one TPC command, each TPC is 2 bits, and each TPC command may correspond to each terminal. The DCI format 3A includes at least one TPC command, each TPC command is 1 bit, and each TPC may correspond to each terminal. The DCI format 3/3A may include padding bits in order to have the same payload size as that of the DCI format 0. The terminal receiving the DCI format 3/3A receives signaling of a parameter TPC-Index from an upper layer to determine presence of reception (for example, to determine whether to receive the TPC command, or to determine the TPC command for the terminal among a plurality of TPC commands when the TPC is received). In this case, the parameter TCP-Index has an integer from 1 to 15 in a case of the DCI format 3, and has an integer from 1 to 31 in a case of the DCI format 3A. The DCI format 3/3A is transmitted through a Common Search Space (CSS) of a primary cell.

When the CRC for the DCI format 3/3A is scrambled by the TPC-PUSCH-RNTI, the DCI format 3/3A may be used for three purposes. In detail, the DCI format 3/3A may be used for uplink PUSCH power control according to Semi-Persistent Scheduling (SPS), uplink non-adaptive retransmission PUSCH power control of the primary cell, or SRS power control of the primary cell.

Figure 2:
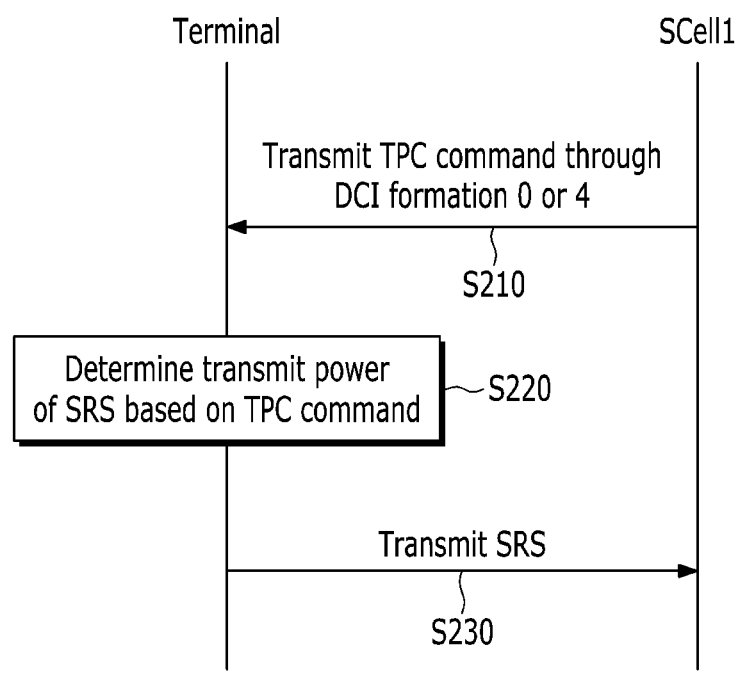
FIG. 2 is a diagram illustrating a method of controlling transmit power of an SRS through a DCI format 0/4 by a terminal and a serving cell when cross carrier scheduling is not set.
Figure 3:
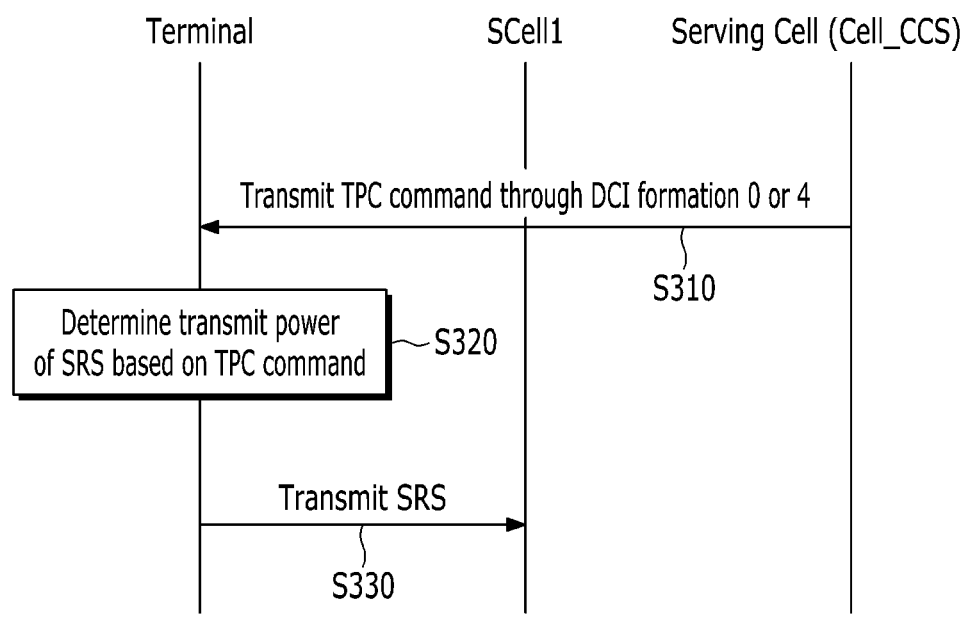
FIG. 3 is a diagram illustrating a method of controlling transmit power of an SRS through a DCI format 0/4 by a terminal and a serving cell when the cross carrier scheduling is set.

A method of controlling transmit power of an SRS through a DCI format 3/3A or a DCI format 0/4 by a terminal and a serving cell terminal will be described with reference to FIG. 1 to FIG. 3. In FIG. 1 to FIG. 3, a secondary cell (SCell1) of the terminal may include a first TDD cell, a TDD cell set as a UL-DL configuration 7 or 8, or a FDD cell.

FIG. 1 is a diagram illustrating a method of controlling transmit power of an SRS through a DCI format 3/3A by a terminal and a serving cell.

A primary cell PCell of a terminal transmits a DCI format 3/3A including a TPC command to the terminal (S110). In the specification, transmission of the serving cell includes transmission by a base station having (controlling) the serving cell through the serving cell. Further, in the specification, transmission of the DCI includes transmission of a DCI of a DCI format. The CRC of the DCI format 3/3A is scrambled by a TPC-PUSCH-RNTI.

The terminal determines transmit power of an SRS based on a TPC command for the terminal among a plurality of TPC commands included in a received DCI format 3/3A (S120). In detail, the terminal may determine a TPC command for the terminal among a plurality of TPC commands included in the DCI format 3/3A, and may control power transmission of an SRS based on the TPC command for the terminal.

The terminal transmits the SRS to a secondary cell (SCell1) of the terminal using the determined (controlled) power transmission (S130). In the specification, transmission to the serving cell includes transmission to the base station having (controlling) the serving cell through the serving cell.

FIG. 2 is a diagram illustrating a method of controlling transmit power of an SRS through a DCI format 0/4 by a terminal and a serving cell when cross carrier scheduling is not set.

A secondary cell (SCell1) of a terminal transmits a DCI format 0/4 including a TPC command to the terminal (S210).

The terminal determines (controls) transmit power of an SRS based on a TPC command included in a received DCI format 0/4 (S220).

The terminal transmits the SRS to the secondary cell SCell1 of the terminal using the determined (controlled) transmit power of the SRS (S230).

FIG. 3 is a diagram illustrating a method of controlling transmit power of an SRS through a DCI format 0/4 by a terminal and a serving cell when the cross carrier scheduling is set. In FIG. 3, the serving cell Cell_CCS performing the cross carrier scheduling may include a primary cell of the terminal cell or another primary cell of the terminal.

The serving cell Cell_CCS transmits a DCI format 0/4 including a TPC command to a terminal (S310). The TPC command transmitted in step S310 is for a secondary cell SCell1 of the terminal.

The terminal determines (controls) transmit power of an SRS based on a TPC command included in a received DCI format 0/4 (S320).

The terminal transmits the SRS to a secondary cell SCell1 of the terminal using the determined (controlled) transmit power of the SRS (S330).

2. Method of Controlling Uplink SRS Power

A method of controlling power with respect to uplink SRS transmission by a carrier aggregation system will now be described.

The terminal may transmit the uplink SRS in a periodic transmission (trigger type 0) scheme and in an aperiodic transmission (trigger type 1) scheme. The periodic transmission scheme transmits the SRS according to a transmission periodicity received through upper layer signaling by the terminal and sub-frame offset. The aperiodic transmission scheme is a scheme performed by the terminal when the base station triggers SRS transmission using an SRS request field of a DCI format 0/1A/2B/2C/2D/4. In this case, SRS transmission triggering using a downlink DCI format 2B/2C/2D is possible only in a TDD mode.

Transmit power of the SRS that the terminal transmits in a sub-frame i through the serving cell c depends on the following Equation 1.

$$P_{SRS,c}(i) = \min \{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} [dBm] \quad \text{[Equation 1]}$$

In Equation 1, $P_{CMAX,c}(i)$ represents maximum transmit power of the terminal, which is maximum transmit power available in the sub-frame i with respect to the serving cell c by the terminal. The $P_{SRS\_OFFSET,c}(m)$ represents power offset according to an SRS transmission trigger type m (m=0,1) set by upper layer signaling. The $M_{SRS,c}$ represents the number of resource blocks (RBs) from SRS transmission. The $P_{O\_PUSCH,c}(j)$, the $\alpha_c(j)$, and the $f_c(i)$ are parameters for uplink PUSCH power control, and may be used for SRS power control. The $PL_C$ represents downlink path loss. The $f_c(i)$ represents a transmit power control value for a PUSCH transmitted in the sub-frame i, and the base station controls the $f_c(i)$ using the above TPC command for the PUSCH power control.

Meanwhile, since the uplink sub-frame is not included in the secondary cell (hereinafter referred to as 'second TDD secondary cell') set as the second TDD cell, the PUSCH is not transmitted to a corresponding second TDD secondary cell. This means that the base station does not need to transmit uplink grant (UL grant) for PUSCH scheduling in a corresponding second TDD secondary cell. Accordingly, if a second TDD secondary cell of a certain terminal is activated, the terminal may not monitor an uplink grant, that is, a DCI format 0/4 from a PDCCH of the activated second TDD secondary cell. In this case, the terminal may not use a 'TPC command for scheduled PUSCH' field which is a TPC command field defined in the DCI format 0/4. According to the current LTE standard, the DCI format 3/3A may be used only for power control of the primary cell. As a result, in the second TDD secondary cell, with respect to power control of the SRS to be transmitted in a special sub-frame, closed-loop control according to the TPC command is impossible. This may degrade SRS reception performance in the base station. Such a problem occurs when a secondary cell of the terminal is an existing cell including an uplink sub-frame instead of the second TDD secondary cell. That is, in a case where the secondary cell of the terminal is an FDD secondary cell or a secondary cell (hereinafter referred to as 'first TDD secondary cell') set as the first TDD cell, if an uplink grant is not transmitted through a corresponding secondary cell for a long time, closed-loop power control with respect to the SRS may be impossible for a corresponding time.

Hereinafter, methods of controlling SRS closed-loop power of a secondary cell by a carrier aggregation system in order to solve the above problem will be described. Hereinafter, for convenience of description, when the second cell of the cell is an existing FDD secondary cell or an existing TDD secondary cell on the assumption that a secondary cell of the terminal is a second TDD cell basically set as a configuration 7 or 8, respective methods will be separately described.

2.1. Method (Hereinafter Referred to as 'First Method') of Adding a TPC Command Field for SRS Power Control to a Downlink DCI Format for a TDD Secondary Cell Set as a UL-DL Configuration 7 or 8

In the first method, the downlink DCI format may include a DCI format 1/1A/1B/1C/1D/2/2A/2B/2C/2D. A TPC command field for SRS power control may be added to at least one of downlink DCI formats 1, 1A, 1 B, 10, 1 D, 2, 2A, 2B, 2C, and 2D.

As described above, when the terminal does not monitor an uplink DCI format 0/4 in the second TDD secondary cell, the terminal cannot receive a 'TPC command for scheduled PUSCH' field. The first method is a method which allows the terminal to receive a TPC command field by adding the TPC command field to a downlink DCI format. In this case, since the added TPC command field is for SRS power control, for convenience of description, a TPC command for SRS power control refers to a 'TPC command for SRS' below. The 'TPC command for SRS' field may be configured by 2 bits, the same as in an existing 'TPC command for scheduled PUSCH' field.

According to the first method, when the secondary cell of the terminal is the second TDD cell set as the UL-DL configuration 7 or 8, the terminal receives a downlink DCI with respect to a corresponding secondary cell, and controls SRS power with respect to a corresponding secondary cell according to a power control value of a 'TPC command for SRS' field of the received DCI. A detailed method using the 'TPC command for SRS' field may be the same as or similar to a method using a 'TPC command for scheduled PUSCH' field of a DCI format defined in the current LTE standard.

Meanwhile, there is a need for definition with respect to the terminal reflecting a 'TPC command for SRS' field of a downlink DCI transmitted in a certain sub-frame on power control with respect to each SRS transmission.

2.1.1. Method (Hereinafter Referred to as 'First-1 Method') of Applying a 'TPC Command for SRS' of a Downlink DCI Received in One Fixed Sub-Frame to Power Control According to the first-1 method, the terminal may use a 'TPC command for the SRS field of the received downlink DCI in a sub-frame i-k for power control of an SRS to be transmitted in the sub-frame i. In this case, the k value may be set as the smallest value greater than 4. In detail, when self-scheduling is performed for the second TDD secondary cell, and cross carrier scheduling is performed by another FDD cell or another second TDD secondary cell, k=4. In a remaining case (case where cross carrier scheduling is performed by a first TDD cell for the second TDD secondary cell), k=$K_{SRS}$, and the $K_{SRS}$ depends on the following Table 4 and Table 5.

TABLE 4

$K_{SRS}$ for UL-DL configuration 7

| UL-DL configuration of TDD cell for which cross carrier scheduling is performed | Sub-frame number i | | | | | | | | | |
|---|---|---|---|---|---|---|---|---|---|---|
| | 0 | 1 | 2 | 3 | 4 | 5 | 6 | 7 | 8 | 9 |
| 0 | — | 5 | — | — | — | — | 5 | — | — | — |
| 1 | — | 5 | — | — | — | — | 5 | — | — | — |
| 2 | — | 5 | — | — | — | — | 5 | — | — | — |
| 3 | — | 4 | — | — | — | — | 5 | — | — | — |
| 4 | — | 4 | — | — | — | — | 5 | — | — | — |
| 5 | — | 4 | — | — | — | — | 5 | — | — | — |
| 6 | — | 5 | — | — | — | — | 5 | — | — | — |

TABLE 5

$K_{SRS}$ for UL-DL configuration 8

| UL-DL configuration of TDD cell for which cross carrier scheduling is performed | Sub-frame number i | | | | | | | | | |
|---|---|---|---|---|---|---|---|---|---|---|
| | 0 | 1 | 2 | 3 | 4 | 5 | 6 | 7 | 8 | 9 |
| 0 | — | 5 | — | — | — | — | — | — | — | — |
| 1 | — | 5 | — | — | — | — | — | — | — | — |
| 2 | — | 5 | — | — | — | — | — | — | — | — |
| 3 | — | 4 | — | — | — | — | — | — | — | — |
| 4 | — | 4 | — | — | — | — | — | — | — | — |
| 5 | — | 4 | — | — | — | — | — | — | — | — |
| 6 | — | 5 | — | — | — | — | — | — | — | — |

That is, if a sub-frame i-4 of a serving cell through which a DCI is transmitted is a downlink sub-frame, $K_{SRS}$=4. Otherwise, $K_{SRS}$=5. For example, when a sub-frame i in which the SRS will be transmitted is a sub-frame 1, and a first TDD cell for which cross carrier scheduling is performed is set as a TDD UL-DL configuration 0, since a sub-frame 1-4 (i.e., sub-frame 7) of the first TDD cell is an uplink sub-frame, $K_{SRS}$=5. For example, when a sub-frame i in which the SRS will be transmitted is a sub-frame 1, and a first TDD cell for which cross carrier scheduling is performed is set as a TDD UL-DL configuration 5, since a sub-frame 1-4 (i.e., sub-frame 7) of the first TDD cell is an uplink sub-frame, $K_{SRS}$=4.

2.1.2. Method (Hereinafter Referred to as 'First-2 Method' of Defining a Group of Sub-Frames in which a 'TPC Command for SRS' May be Received, and Applying a 'TPC Command for SRS' Value of a Finally Received DCI Among Received DCIs in the Defined Sub-Frame Group to Power Control According to the first-2 method, with respect to an SRS to be transmitted in the sub-frame i, a sub-frame group S in which a downlink DCI including a 'TPC command for SRS' may be received may be defined by the following Table 6.

TABLE 6

Sub-frame group S with respect to SRS transmission in a sub-frame i

| UL-DL configuration of SRS transmission cell | Sub-frame group S |
|---|---|
| 7 | S = {i-k\|4 ≤ k ≤ 8, sub-frame i-k of serving cell in which a corresponding DCI is transmitted is downlink or special sub-frame} |
| 8 | S = {i-k\|4 ≤ k ≤ 13, sub-frame i-k of serving cell in which a corresponding DCI is transmitted is downlink or special sub-frame} |

For example, when self-scheduling is performed for the second TDD secondary cell, and cross carrier scheduling is performed by another FDD cell or another second TDD secondary cell, since a sub-frame of a serving cell through which the DCI is transmitted is a downlink sub-frame or a special sub-frame, the sub-frame group S depends on a following Table 7. In detail, when a sub-frame i in which the SRS will be transmitted is a sub-frame 1, and a serving cell through which the DCI is transmitted is the second TDD secondary cell, since a sub-frame 1-4 (i.e., sub-frame 7), a sub-frame 1-5 (i.e., sub-frame 6), . . . , and a sub-frame 1-8 (i.e., sub-frame 3) of the serving cell in which the DCI is transmitted are a downlink sub-frame or a special sub-frame, S={3, 4, 5, 6, 7}.

TABLE 7

Example of k for sub-frame group S

| UL-DL configuration of SRS transmission cell | Sub-frame number i | | | | | | | | |
|---|---|---|---|---|---|---|---|---|---|
| | 0 | 1 | 2 | 3 | 4 | 5 | 6 | 7 | 8 | 9 |
| 7 | — | {4, 5, 6, 7, 8} | — | — | — | — | {4, 5, 6, 7, 8} | — | — | — |
| 8 | — | {4, 5, 6, 7, 8, 9, 10, 11, 12, 13} | — | — | — | — | — | — | — | — |

In contrast, in a remaining case (i.e., a case where carrier scheduling is performed by a first TDD cell), the size of the sub-frame group S may be reduced by the number of uplink sub-frames located within a period of a scheduled cell.

2.1.3. Method (Hereinafter Referred to as 'First-3 Method') of Defining a Group of Sub-Frames in which a 'TPC Command for SRS' May be Received, Applying 'TPC Command for SRS' Values of all DCIs Received in the Sub-Frame Group to Power Control when Power Control of an Accumulation Scheme is Set, and Applying a 'TPC Command for SRS' Value Finally Received Among Received DCIs in the Sub-Frame Group when the Power Control of an Accumulation Scheme is not Set According to the current LTE standard, an accumulated power control value to be transferred through a TPC command filed of a DCI format 0/3/4 is −1, 0, 1, 3 dB, and a relatively greater power control value to increase the transmit power is defined. Accordingly to the first-3 method, when power control of an accumulation scheme is set, since a plurality of 'TPC command for SRS' values with respect to an SRS transmitted in the sub-frame i may be used, a range of an accumulated power control value may be extended. That is, the base station transmits a plurality of 'TPC command for SRS' fields to the terminal and the terminal accumulates and applies the values so that power may be controlled to a value smaller than −1 dB or greater than 3 dB. Meanwhile, when power control of the accumulation scheme is not set, the first-3 method is the same as the first-2 method. In addition, a sub-frame group S according to the first-3 method may be the same as a sub-frame group S according to the first-2 method.

In the meantime, in the first-1 method to the first-3 method, the terminal cannot receive a downlink DCI including a 'TPC command for SRS' in a corresponding sub-frame or a sub-frame group. In this case, a scheme of equally using closed-loop power control of a most recent applied SRS from the terminal may be applied. Hereinafter, as different methods from a method (for example, the first method) using a downlink DCI (for example, DCI format 1/1A/1 B/1 D/2/2A/2B/2C/2D), methods of extending a purpose of an existing DCI format 3/3A or introducing a new DCI for group power control are described. Hereinafter, the following methods may be applied simultaneously with the first method without conflicting with the first method.

2.2. Method (Hereinafter Referred to as 'Second Method') of Adding a Carrier Indicator Field (CIF) to a DCI Format 3/3A Since a DCI format 3/3A of the current LTE standard is transmitted through a common search space (CSS) of a primary cell and does not include the CIF, the DCI format 3/3A is used for group power control of only the primary cell. According to the second method, the base station may transmit a group TPC command for a secondary cell of the terminal, and may control cross carrier power for SRS transmission using a DCI format 3/3A (field of DCI format 3/3A according to LTE standard+CIF) further including a CIF. The CIF of DCI format 3/3A (hereinafter referred to as 'modified DCI format 3/3A') including the CIF may represent a cell to which a TPC command of the modified DCI format 3/3A is applied.

In this case, the secondary cell indicated by the CIF (or CI) may be limited to only a second TDD cell set as a UL-DL configuration 7 or 8 which does not receive the uplink DCI, and may be an existing FDD cell or an existing TDD cell (for example, the first TDD cell). The CIF for cross carrier power control may be distinguished from the CIF for the existing cross carrier scheduling. Presence of inclusion in the modified DCI format 3/3A may be set to the CIF for cross carrier power control according to an upper layer signal as in the existing CIF. The CIF for cross carrier power control may be 3 bits as in the CIF for an existing cross carrier power control. There is no limitation in the bit number of the CIF for cross carrier power control.

Figure 4:
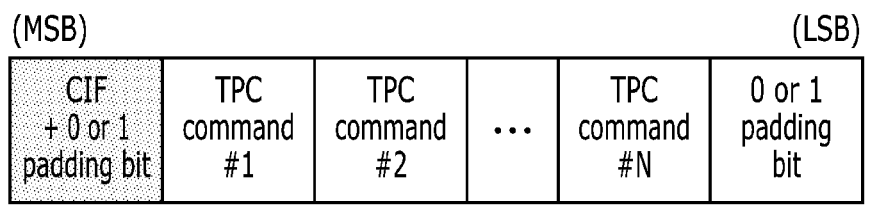
FIG. 4 is a diagram illustrating a bit map of a DCI format 3 including a CIF in accordance with an exemplary embodiment of the present invention.
Figure 4:
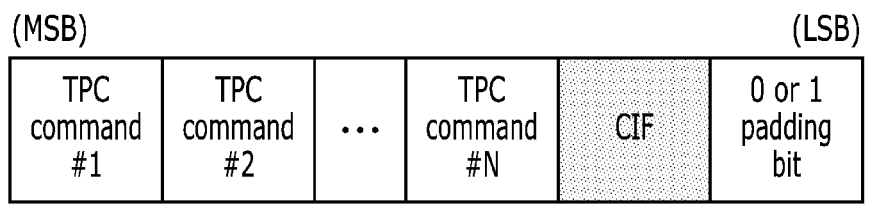

Meanwhile, in the modified DCI format 3/3A, a position of the CIF to be mapped (inserted) may depend on two methods (second-1 method, second-2 method). According to the second-1 method, the CIF is mapped to Most Significant Bits (MSBs) of the modified DCI format 3/3A. According to the second-2 method, the CIF is mapped to Least Significant Bits (LSBs) of the DCI format 3/3A. FIG. 4 is a diagram illustrating a bit map of a DCI format 3 including a CIF in accordance with an exemplary embodiment of the present invention. The second-1 method corresponds to FIG. 4 (A), and the second-2 method corresponds to FIG. 4 (B).

Meanwhile, if the bit map of the second-1 method is applied, a position of a TPC command field (N TPC command fields) of a modified DCI format 3/3A is shifted in an LSB direction by the bit number of the CIF. In this case, since the legacy terminal does not know presence of the CIF, in order to maintain backward compatibility with respect to the legacy terminal, when the base station signals a parameter TPC-Index to the legacy terminal, the base station compensates for a position of the TPC command field by a shifted value to set a TPC-Index.

Meanwhile, in a case of the modified DCI format 3, since TPC commands of 2 bits are continuously allocated, if a TPC command field shift value according to CIF insertion becomes an odd number, the legacy terminal receives no TPC commands in the modified DCI format 3. Accordingly, in order to allow a shift value of the TPC command field to substantially be an even number, when the bit number of the CIF is the odd number, as illustrated in FIG. 4 (A), a padding bit of 1 bit may be inserted after the CIF. Meanwhile, in a case of the modified DCI format 3A, since TPC commands are configured with 1 bit, a padding bit inserted after the CIF is unnecessary. The modified DCI format 3/3A may further include a padding bit located after a TPC field in order to have the same payload size as the DCI format 0.

In contrast, as in the second-2 method, if the CIF is mapped to an LSB of the modified DCI format 3/3A (CIF is inserted after a plurality of TPC command fields), since a position of the TPC command field is not changed (is the same as a position of a TPC command field of a DCI format 3/3A according to the LTE standard), backward compatibility with respect the legacy terminal is ensured. That is, in the second-2 method, the base station may set a TPC-Index to the legacy terminal in the same manner as the related art. Further, according to the second-1 method, an entire bit number of payloads except for a CRC bit of the modified DCI format 3 is an odd number. When the bit number of the CIF is an odd number, a padding bit of a maximum of 2 bits is required. According to the second-2 method, the padding bit of a maximum of 1 bit is required. Accordingly, in PDCCH resource efficiency and signaling side of the base station, the second-1 method is more advantageous than the second-2 method. The modified DCI format 3/3A may further include a padding bit located after a CIF in order to have the same payload size as the DCI format 0.

Meanwhile, according to the second-1 method, a modified DCI format 3 including the CIF may include N(=floor$((L_{format0}-2*ceil(L_{CIF}/2))/2)$) TPC commands, and a modified DCI format 3A including the CIF may include M ($=L_{format0}-L_{CIF}$) TPC commands. According to the second-2 method, a modified DCI format 3 may include N (=floor$((L_{format0}-L_{CIF})/2)$) TPC commands, and a modified DCI format 3A may include M ($=L_{format0}-L_{CIF}$) TPC commands. In this case, the $L_{format0}$ represents a payload size except for a CRC of the DCI format 0, and the $L_{CIF}$ represents the bit number of the CIF.

Meanwhile, when the second method is applied, the terminal should receive setting of a plurality of TPC-PUSCH-RNTI and a tpc-Index corresponding to the TPC-PUSCH-RNTI in order to receive a group TPC command with respect to a plurality of serving cells including a primary cell. Accordingly, an extending method which allows the terminal to receive setting of upper layer signaling tpc-RNTI and the tpc-Index by serving cells may be considered.

2.3. Method (Hereinafter Referred to as 'Third Method') of Introducing a DCI Format for New Group Power Control Including a CIF Using an Existing DCI Format 3/3A without Change According to the third method, a payload size of a newly introduced DCI format is the same as a payload size of the DCI format 3/3A. For convenience of description, the newly introduced DCI format in the third method refers to a DCI format 3B or a DCI format 3C. The DCI format 3B including a CIF includes a plurality of TPC commands having 2 bits, similar to the DCI format 3, and a payload size of the DCI format 3B is the same as a payload size of the DCI format 3. The DCI format 3C including a CIF includes a plurality of TPC commands having 1 bit similar to the DCI format 3A, and a payload size of the DCI format 3C is the same as a payload size of the DCI format 3A.

The DCI format 3B/3C may be set the same as or similar to a modified DCI format 3/3A in the second-1 method or the second-2 method. However, since the third method uses an existing DCI format 3/3A according to an LTE standard without change, backward compatibility with respect to the legacy terminal is ensured. Accordingly, when the bit map of the second-1 method is applied to the DCI format 3B, although the bit number of the CIF is an odd number, there is no need to insert a padding bit of 1 bit after a CIF of an odd bit.

Meanwhile, when the third method is applied, the legacy terminal may receive only a DCI format 3/3A, and a new terminal may receive only the DCI format 3B/3C or receive both of the DCI format 3/3A and the DCI format 3B/3C. In the former case (a new terminal receives only DCI format 3B/3C), the third method may be the same as the second method in a reception operation aspect of the terminal. In the latter case (the new terminal receives both of the DCI format 3/3A and the DCI format 3B/3C), when the base station transmits the DCI format 3B/3C, in order to distinguish the DCI format 3B/3C from the DCI format 3/3A, different TPC-PUSCH-RNTIs may be used or a new type of RNTI defined for the DCI format 3B/3C may be used.

In the same manner as the third method, the secondary cell indicated by the CIF may be limited to only a second TDD cell set as UL-DL configuration 7 or 8, and may be an existing FDD cell or an existing TDD cell (for example, first TDD cell).

In the second method, the modified DCI format 3/3A may be transmitted only through a primary cell. In the same manner, in the third method, the DCI format 3/3A/3B/3C may be transmitted only through a primary cell. Accordingly, if primary cells of two particular terminals are different from each other, although the base station instructs a power control command for the same secondary cell, there is a need for two different group TPC commands. The following Table 8 is an example of the carrier aggregation scenario, which indicates a case where three terminals are connected to three serving cells through carrier aggregation.

TABLE 8

Example of operation of a serving cell in a carrier aggregation system

|  | First serving cell | Second serving cell | Third serving cell |
| --- | --- | --- | --- |
| First terminal | primary cell | second cell |  |
| Second terminal |  | second cell | primary cell |
| Third terminal |  | primary cell | second cell |

In Table 8, it is assumed that each serving cell (first to third serving cells) is an existing FDD cell or an existing TDD cell which may be operated as a primary cell, and it is assumed that the second method or the third method is applied to all secondary cells for a target. The first terminal and the second terminal are configured so that the second serving cell serves as the secondary cell. In this case, when the base station controls SRS (or PUSCH) power with respect to the secondary cell of the first terminal and the second terminal, the base station cannot simultaneously control the first and second terminals using one group TPC command. That is, the TPC command with respect to the first terminal should be transmitted through the first serving cell, and the TPC command with respect to the second terminal should be transmitted through the third serving cell. For example, the second terminal and the third terminal are connected to the same two serving cells (second serving cell and third serving cell), but primary cells for the second terminal and the third terminal differ from each other. In this case, in order to control power with respect to serving cells of the second terminal and the third terminal, two TPC commands should be transmitted through each of the second serving cell and the third serving cell. In detail, the base station transmits a DCI for a primary cell (third serving cell) of the second terminal and a DCI for a secondary cell (second serving cell) of the second terminal through the third serving cell, and transmits a DCI for a primary cell (second serving cell) of the third terminal and a DCI for a secondary cell (third serving cell) of the third terminal through the second serving cell. Accordingly, in a case of Table 8, although the number of serving cells is 3 and the number of terminals is 3, a total number of group TPC commands required is 6, and the total number of group TPC commands may be increased as the number of terminals is increased. Meanwhile, when the second method or the third method are applied to only the second TDD secondary cell set as the UL-DL configuration 7 or 8, the same problem may occur as that in an example of the former case (i.e., the case of the first terminal and the second terminal).

As described above, in the power control method of the second method and the third method, since the number of a modified DCI format 3/3A (case of the second method) or format 3/3A/3B/3C (case of the third method) to be simultaneously transmitted through a common search space of the primary cell may be increased as compared with the related art, a resource for DCI allocation may be insufficient with only a PUSSCH common search space defined in a current LTE standard listed in the following Table 9.

TABLE 9

PDCCH candidates of common search space monitored by the terminal

| Type | Search space $S_k^{(L)}$ | | Number of PDCCH candidates $M^{(L)}$ |
|---|---|---|---|
| | Aggregation level L | Size [in CCEs] | |
| Common | 4 | 16 | 4 |
| | 8 | 16 | 2 |

In order to solve the insufficient resource problem, a method of increasing a size of a PDCCH common search space of the primary cell may be considered. As listed in Table 9, an existing common search space may be configured to have total 16 CCEs from CCE (Control Channel Element) index 0 to CCE index 15, and to have four and two PDCCH candidates with respect to CCE aggregation levels 4 and 8, respectively. A method of allocating more CCEs to the common search space by extending this and increasing the number of PDCCH candidates according thereto may be considered. In this case, the number of CCEs that the extended PDCCH common search space occupies may be determined to be greater than 16 as a multiple of 4 or a multiple of 8 by taking into consideration that the CCE aggregation level designated in the common search space is 4 and 8.

2.4. Method (Hereinafter Referred to as 'Fourth Method') of Introducing a DCI Format for New Group Power Control Including a CIF Using an Existing DCI Format 3/3A without Change A payload size of the new DCI format introduced in the fourth method is the same as a payload size of the DCI format 1C. For convenience of description, in the new DCI formation introduced in the fourth method, a new DCI format refers to a DCI format 5 or a DCI format 5A. The DCI format 5 including the CIF includes a plurality of TPC commands of 2 bits, similar to the DCI format 3, and the DCI format 5A including the CIF includes a plurality of TPC commands of 1 bit similar to the DCI format 3A. The DCI format 5/5A may be configured in the same manner as in the DCI format 3B/3C except for the payload size with respect to the DCI format 3B/3C.

Meanwhile, when primary cells and secondary cells of the first terminal and the second terminal are listed in the following Table 10 and cross carrier power control is considered, there is generally a high probability that the size of a terminal group being a group power control target of the secondary cell is smaller than the size of a terminal group being a group power control target of the primary cell.

TABLE 10

Another example of an operation of a serving cell in the carrier aggregation system

| | First serving cell | Second serving cell | Third serving cell |
|---|---|---|---|
| First terminal | primary cell | secondary cell | |
| Second terminal | primary cell | | secondary cell |

Accordingly, the fourth method is a modified method of the third method. The payload size of the DCI format for group power control 5/5A in the fourth method is the same as the payload size of the DCI format 1C and smaller than the DCI format 3/3A. For example, the payload size of the DCI format 3/3A except for a CRC bit in a cell having 50 Resource Blocks (RBs) is 27 bits, and a payload size of the DCI format 1C is 13 bits. In this case, when the fourth method is applied, the payload size of the DCI format 5/5A is 13 bits, 3 of 13 bits are allocated for the CIF, and remaining bits (10 bits) may be allocated for at least one TPC command. In detail, the DCI format 5 may indicate a group power control command to a maximum of five terminals, and the DCI format 5A may group the power control command to a maximum of ten terminals. Meanwhile, in a case of the fourth method, in the same manner, a CIF indicated by the secondary cell may be limited to only the second TDD cell set as the UL-DL configuration 7 or 8, and may be an existing FDD cell or an existing TDD cell (for example, first TDD cell).

Meanwhile, since the size of the DCI format 5/5A is smaller than the size of the DCI format 3/3A, when the DCI format 5/5A is transmitted on a CCE aggregation level (for example, an aggregation level 4 or 8) like the DCI format 3/3A, the terminal may be ensured to have higher reception performance due to an increase of a coding gain. Meanwhile, since the size of the DCI format 5/5A is smaller than the size of the DCI format 3/3A, for allocation of the DCI format 5/5A, a method of adding a search space of an aggregation level 2 to a common search space of a PDCCH may be considered. The added search space of the aggregation level 2 may be set as the exclusive use DCI format 5/5A allocation (only a DCI formation 5/5A is transmitted in the search space of the aggregation level 2), and the added search space of an aggregation level 2 may be set to be allocated for other existing DCI formats as well as a DCI format 5/5A (a DCI format 5/5A and another DCI format are transmitted in a search space of an aggregation level 2). The following Table 11 lists an example of the extended PDCCH common search space to which the aggregation level 2 is added.

TABLE 11

Example of a PDCCH common search space including aggregation level 2

| Type | Search space $S_k^{(L)}$ | | Number of PDCCH candidates $M^{(L)}$ |
|---|---|---|---|
| | Aggregation level L | Size [in CCEs] | |
| Common | 2 | 16 | 8 |
| | 4 | 16 | 4 |
| | 8 | 16 | 2 |

However, similar to the second method and the third method, the fourth method has a problem that DCI overhead in a PDCCH common search of the primary cell may increase. Further, the second to fourth methods have a problem that a great number of RNTI values may be set as TPC-PUSCH-RNTI when a plurality of terminal groups are set with respect to a plurality of serving cells. Hereinafter, a method capable of attenuating DCI overhead or an insufficient RNTI value problem of a primary cell which may be generated in the above methods is described.

2.5. Method (Hereinafter Referred to as 'Fifth Method') for Setting a Common Search Space in a PDCCH of a Secondary Cell of the Terminal, and Transmitting a DCI Format 3/3A Through a PDCCH Common Search Space of the Secondary Cell When the fifth method is applied, the base station may transmit a group TPC command for the serving cell through a PDCCH common search space of a serving cell which is a power control target instead of the primary cell of the terminal. Accordingly, the base station manages a terminal group for power control by only serving cells regardless of preset information of the primary cell and the secondary cell of each terminal. In an example of Table 8, when the second method, the third method, or the fourth method is applied, a maximum of 6 group TPC commands are required. In contrast, when the fifth method is applied, the base station may control power of all cells by transmitting one command per serving cell, that is, only three group TPC commands. In more detail, in the example of Table 8, the base station transmits one group TPC command through a first serving cell, transmits one group TPC command through a second serving cell, and transmits one group TPC command through a third serving cell. Further, the first terminal controls transmit power of an SRS to be transmitted through a first serving cell based on a TPC command for the terminal among group TPC commands transmitted through the first serving cell, and controls transmit power of the SRS to be transmitted through the second serving cell based on a TPC command for the terminal among group TPC commands transmitted through the second serving cell. In addition, each of the second terminal and the third terminal controls transmit power of the SRS to be transmitted through the second serving cell based on a TPC command for the terminal among group TPC commands transmitted through the second serving cell, and controls the transmit power of the SRB to be transmitted through a third serving cell based on a TPC command for the terminal among group TPC commands transmitted through the third serving cell.

Meanwhile, similar to the second to fourth methods, in a case of the fifth method, a secondary cell to which the PDCCH common search space is set may be limited to only a second TDD cell set as the UL-DL configuration 7 or 8, and may be an existing FDD cell or an existing TDD cell (for example, the first TDD cell).

Meanwhile, a PDCCH common search space (hereinafter referred to as 'first command search space') of a secondary cell set in the fifth method may be set similar to a common search space of the primary cell. In detail, as listed in Table 9, the first common search space has a total of 16 CCEs from CCE index 0 to 15, and may be configured to have four and two PDCCH candidates with respect to CCE aggregation levels 4 and 8, respectively.

In the meantime, the number of types of DCI formats (may include only a DCI format 3/3A, or may include other DCI formats as well as the DCI format 3/3A) that the terminal should monitor in the first common search space may be smaller than the number of types of DCI formats which the terminal should monitor in a command search space of the primary cell. Accordingly, it may be efficient to set the size of the first command search space to be smaller than the common search space of the primary cell. Accordingly, a scheme of setting the first common search space to be a subset of CCEs included in a PDCCH common search space of the primary cell may be considered. For example, as listed in the following Table 12, the size of the first common search space may be configured as half (i.e., 8 CCEs) of a common search space of the primary cell, and may be configured to having two and one PDCCH candidates with respect to CCE aggregation levels 4 and 8, respectively. In this case, a continuous value from 0 to 7 or from 8 to 15 may be allocated to an index for 8 CCEs.

TABLE 12

Example of PDCCH candidates of a first common search space monitored by the terminal

| | Search space $S_k^{(L)}$ | | |
|---|---|---|---|
| Type | Aggregation level L | Size [in CCEs] | Number of PDCCH candidates $M^{(L)}$ |
| Common | 4 | 8 | 2 |
| | 8 | 8 | 1 |

The fifth method may use the above existing DCI format 3/3A without changing the DCI format 3/3A, and introducing the new DCI format. However, as described above, since the terminal should additionally monitor the first common search space in the secondary cell, PDCCH blind decoding complexity may be increased as compared with the current LTE standard.

Meanwhile, in the second to fifth methods, a serving cell through which the DCI format 3/3A, the DCI format 3/3A/3B/3C, or the DCI format 3/3A/5/5A is transmitted is fixed as one of the primary cell and the secondary cell. In an interference control side between cells of the PDCCH, similar to a case of existing cross carrier scheduling, it is preferable that the base station may dynamically select a serving cell through which a DCI for group power control will be transmitted.

Hereinafter, a method capable of controlling cross carrier group power in a plurality of serving cells by the base station will be described.

2.6. Method (Hereinafter Referred to as 'Sixth Method') of Adding a CIF to the DCI Format 3/3A, Setting a Common Search Space in a PDCCH of a Secondary Cell(s), and Transmitting a DCI Format 3/3A Modified Through a PDCCH Common Search Space of the Secondary Cell(s)

The sixth method is a combination of the second method and the fifth method.

2.7. Method (Hereinafter Referred to as 'Seventh Method') of Using the Existing DCI Format 3/3A without Change, Introducing the DCI Format 3B/3C, Setting a Common Search Space in a PDCCH of the Secondary Cell(s) of the Terminal, and Transmitting the DCI Format 3B/3C Through a PDCCH Common Search Space of the Secondary Cell(s)

The seventh method is a combination of the third method and the fifth method.

2.8. Method (Hereinafter Referred to as 'Eighth Method') of Using the Existing DCI Format 3/3A without Change, Introducing the DCI Format 5/5A, Setting a Common Search Space in a PDCCH of the Secondary Cell(s) of the Terminal, and Transmitting the DCI Format 5/5A Through a PDCCH Common Search Space of the Secondary Cell(s)

The eighth method is a combination of the fourth method and the fifth method.

When the sixth method, the seventh method, or the eighth method is applied, the base station may transmit a DCI for group power control including a CIF on a PDCCH common search space of a plurality of serving cells which the terminal has, and may control SRS power with respect to a cell indicated by the CIF. In this case, setting of the PDCCH common search space with respect to each secondary cell of the terminal may be controlled by signaling of the base station. That is, the base station may set a PDCCH common search space in all secondary cells of the terminal, and may set the PDCCH common search space in only a specific secondary cell(s). For example, the base station may be configured so that serving cells aggregating a carrier by introducing a concept of the serving cell group form one or a plurality of serving cell groups. In this case, the common search space of the PDCCH may be set in only one representative serving cell for every serving cell group.

Meanwhile, with respect to a secondary cell to which the PDCCH common search space is set, presence of cross carrier power control with respect to another serving cell may be set according to setting of the existing cross carrier scheduling, and may be independently set through a separately introduced upper layer signaling.

According to the current LTE standard, a PDCCH candidate m located in a search space $S_k^{(L)}$ of the PDCCH in a sub-frame k corresponds to CCE indexes of the following Equation 2.

$$L\{(Y_k+m') \bmod \lfloor N_{CCE,k}/L \rfloor\}+i, (i=0,\ldots,L-1) \qquad \text{[Equation 2]}$$

In Equation 2, the $N_{CCE,k}$ represents the total number of CCEs located in the sub-frame k. In a case of the common search space, the aggregation level L=4 or 8, $Y_k$=0, and m'=m. In a case of a terminal-specific search space, the aggregation level L=1, 2, 4, or 8, m'=m+$M^{(L)}$*$n_{CI}$. The $Y_k$ is given a function of the sub-frame number k and an RNTI of the terminal. In this case, the $M^{(L)}$ represents the number of PDCCH candidates to be monitored in a corresponding search space, and the $n_{CI}$ represents a CIF value. In this way, the PDCCH terminal-specific search space essentially includes a search space for self-scheduling of a corresponding cell, and may be extended depending on whether cross carrier scheduling of the corresponding cell is set. An entire size of the extended search is proportional to the number of cells self-scheduled or cross carrier scheduled by a corresponding cell, that is, the number of $n_{CI}$.

Meanwhile, when the sixth method, the seventh method, or the eighth method is applied, in the above similar scheme, a search space may be extended with respect to a PDCCH common search space set to the secondary cell according to whether to set power control of the cross carrier. The existing common search space includes only a search space for self-scheduling so that m'=m. In contrast, an extended common search space may be defined as m'=m+$M^{(L)}$*$n_{CI}$ by additionally taking into consideration a search space for another serving cell in which cross carrier power is controlled. In this case, the $M^{(L)}$ represents the number of PDCCH candidates to be monitored in a common search space having an aggregation level L, and the $n_{CI}$ represents a CIF value for cross carrier power control. That is, the extended PDCCH common search space includes a search space with respect to each serving cell in which power is controlled from a corresponding cell. Respective search spaces are separated from each other, and are continuously allocated to CCEs. In this case, the $n_{CI}$ may be the same as or different from an $n_{CI}$ value in an existing terminal-specific search space according to a form of upper layer signaling. In this case, when payload sizes of the DCI format(s) to be monitored by the terminal are equal with respect to all serving cells indicated by each $n_{CI}$, the base station does not separate the search space by $n_{CI}$, but combines the search space as one, and may allocate all DCIs on the entire combined search space.

3. Uplink PUCCH Power Control

The following is a description of a method of controlling transmit power of a PUCCH by the terminal and the base station when there are a plurality of cells through which a PUCCH may be transmitted in the carrier aggregation system.

Figure 5:
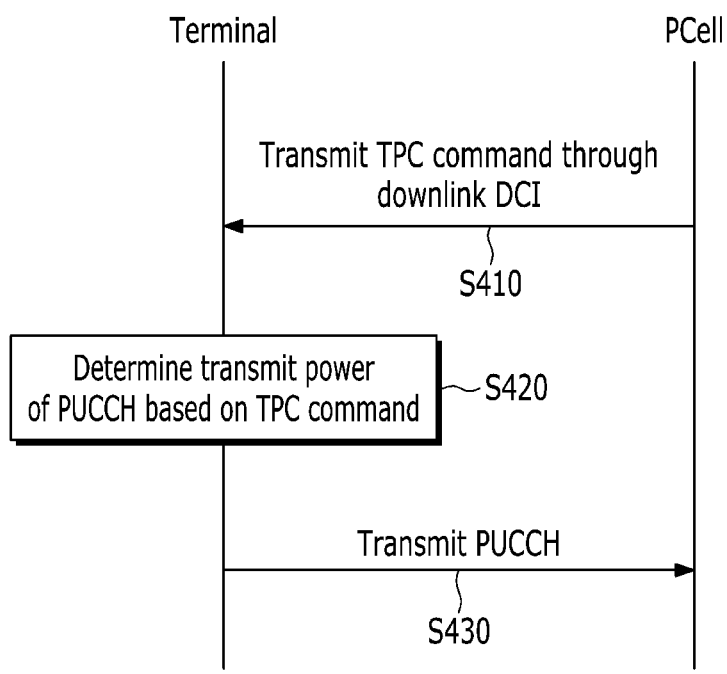
FIG. 5 is a diagram illustrating a method of controlling transmit power of a PUCCH through a downlink DCI format by the terminal and the serving cell.

FIG. 5 is a diagram illustrating a method of controlling transmit power of a PUCCH through a downlink DCI format by the terminal and the serving cell.

A primary cell PCell of a terminal transmits a downlink DCI format (for example, DCI format 1/1A/1B/1D/2/2A/2B/2C/2D) including a TPC command ('TPC command for PUCCH') to the terminal (S410).

The terminal determines (controls) transmit power of a PUCCH based on the TPC command included in a received downlink DCI format (S420).

The terminal transmits the PUCCH to the primary cell PCell of the terminal using the determined (controlled) transmit power (S430).

Figure 6:
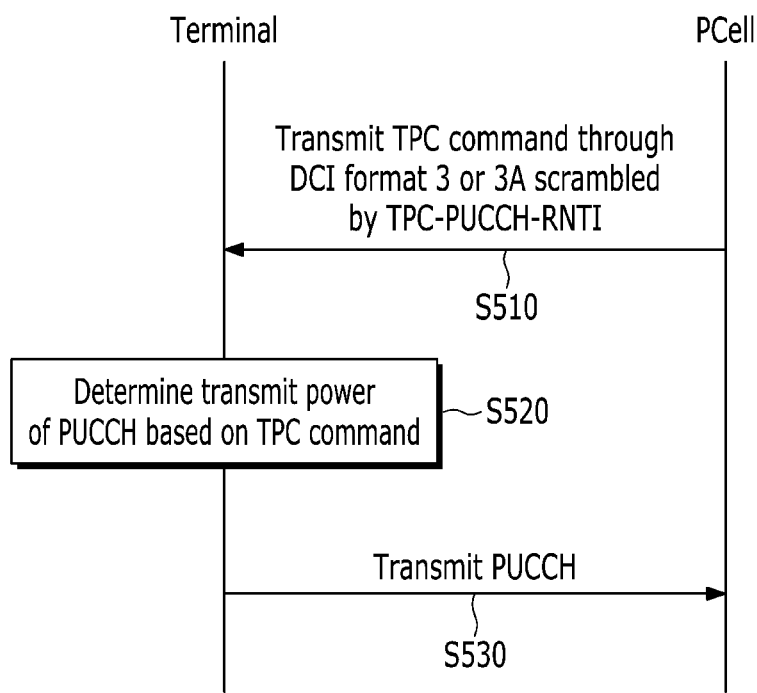
FIG. 6 is a diagram illustrating a method of controlling transmit power of a PUCCH through a downlink DCI format 3/3A by the terminal and the serving cell.

FIG. 6 is a diagram illustrating a method of controlling transmit power of a PUCCH through a downlink DCI format 3/3A by the terminal and the serving cell.

A primary cell PCell of a terminal transmits a DCI format 3/3A including a plurality of TPC commands ('TPC commands for PUCCH') to the terminal (S510). A CRC for the DCI format 3/3A is scrambled by TPC-PUCCH-RNTI.

The terminal determines (controls) transmit power of a PUCCH based on a TPC command for the terminal among a plurality of TPC commands included a received DCI format 3/3A (S520).

The terminal transmits the PUCCH to the terminal to the primary cell (PCell) of the terminal (S530).

3.1. Extension of PUCCH Transmission Cell

A heterogeneous network (HetNet) scenario may take into consideration a case where a plurality of small cells overlap with a macro cell in macro cell coverage. In this case, the connectivity between the macro cell and the small cell is divided into ideally connected backhaul and non-ideally connected backhaul. The former represents a carrier aggregation scenario, and the latter represents a dual connectivity ((DC) scenario. In both of the two scenarios, in a mobility management side, it is preferable to set the macro cell as a primary cell of the terminal.

When a plurality of terminals are connected to one macro cell by using the one macro cell as the primary cell, since a PUCCH with respect to downlink transmission of all serving cells is transmitted only through the primary cell in the carrier aggregation scenario, uplink PUCCH transmission is concentrated to the macro cell so that the PUCCH resource may be insufficient.

In order to solve the insufficient PUCCH resource problem, a method capable of transmitting a PUCCH through the secondary cell by the terminal may be considered. In this case, the terminal may be configured so that the terminal may transmit the PUCCH through all secondary cells of the terminal. Alternatively, the terminal may be configured so that the terminal may transmit the PUCCH only through one or some of the secondary cells by taking into consideration general transmission capability of the terminal. For example, as illustrated in FIG. 7, the terminal may be configured so that the terminal may transmit the PUCCH only through representative serving cells C0 and C3 of PUCCH cell group G1 and G2.

Figure 7:
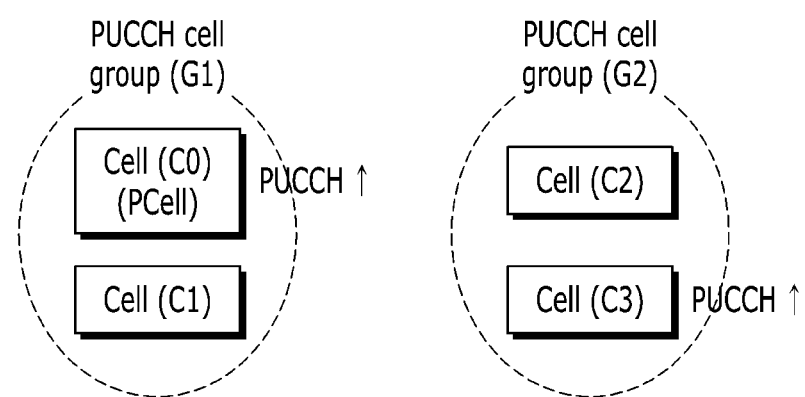
FIG. 7 is a diagram illustrating a plurality of serving cells set as a PUCCH transmission cell in accordance with an exemplary embodiment of the present invention.

FIG. 7 is a diagram illustrating a plurality of serving cells C0 and C3 set as a PUCCH transmission cell in accordance with an exemplary embodiment of the present invention.

A concept of a serving cell group may be introduced with PUCCH transmission. The carrier aggregated serving cells C0 to C3 form one or a plurality of serving cell groups G1 and G2. For convenience of description, FIG. 7 illustrates that the serving cells C0 and C1 form a PUCCH cell group G1, and the serving cells C2 and C3 forms a PUCCH cell group G2.

The PUCCH transmission is possible for every cell group G1 and G2 by using only one representative serving cell C0 or C3. For convenience of description, FIG. 7 illustrates that a serving cell C0 is configured as a representative serving cell for a PUCCH cell group G1, and the serving cell C3 is configured as a representative serving cell for a PUCCH cell group G2.

The PUCCH transmission with respect to serving cells included in each PUCCH cell group G1 and G2 is performed through PUCCH transmission cells C0 and C3 of PUCCH cell groups G1 and G2 to which a corresponding cell belongs. In this case, the PUCCH transmission cell means a cell through which the PUCCH may be transmitted.

Meanwhile, a cell set as the PUCCH transmission cell includes at least a primary cell of the terminal. That is, the cell C0 being the primary cell (PCell) of the terminal should be set as the PUCCH transmission cell. In the meantime, since the second TDD secondary cell does not include an uplink subframe, the second TDD secondary cell may not be set as the PUCCH transmission cell.

Meanwhile, when the terminal is set as a plurality of PUCCH cell group G1 and G2, a method of limiting cross carrier scheduling between cell groups G1 and G2 is applicable. Further, a method of limiting cross carrier scheduling from another serving cell is applicable to PUCCH transmission cells C0 and C3 included in each PUCCH cell group G1 and G2. In this case, DCI with respect to serving cells C0 and C3 set as the PUCCH transmission cell may be transmitted only through the serving cells C0 and C3. The above method is advantageous in that the same existing same scheme is applicable to PUCCH resource allocation of the secondary cell.

In the meantime, if a method of transmitting the PUCCH through the secondary cell is applied, transmission of uplink control information (UCI) may be distributed to the secondary cell, so that PUCCH overhead of the primary cell may be reduced. In this case, the UCI transmitted through the PUCCH includes a scheduling request (SR), a Hybrid Automatic Retransmit request (HARQ)-ACK, and periodic Channel State Information (CSI). Among them, the HARQ-ACK and the periodic CSI information may be essentially transmitted through the PUCCH of the secondary cell. Meanwhile, with respect to transmission of the SR, in the carrier aggregation scenario, since one terminal is connected to one base station MAC entity, the SR may be transmitted only through the primary cell, similar to the related art. Alternatively, in order to attenuate the above insufficient PUCCH resource problem of the macro cell, the SR may be set to be transmitted through the PUCCH of the secondary cell. Meanwhile, in order to distribute PUCCH resource allocation for SR transmission to the secondary cell, a ninth method and a tenth method may be considered. In detail, when the ninth method is applied, the SR is transmitted through one set due to upper layer signaling among a primary cell and a second cell set as the PUCCH transmission cell. That is, the terminal may receive allocation of a PUCCH resource for SR transmission from the one of the primary cell and the secondary cell set as the PUCCH transmission cell. When the tenth method is applied, the SR may be transmitted through both of the primary cell and the secondary cell set as the PUCCH transmission cell. That is, the terminal may simultaneously receive allocation of a PUCCH resource for transmitting the SR from the primary cell and the secondary cell set as the PUCCH transmission cell.

The ninth method and the tenth method may attenuate an insufficient PUCCH resource problem of the macro cell by offloading PUCCH resource allocation for SR transmission to the secondary cell.

Meanwhile, in a case of the tenth method, different periodicities or offsets of the PUCCH resource for SR transmission may be set to the primary cell and the secondary cell, respectively. For example, an SR resource of a relatively short periodicity may be set to the secondary cell, and an SR resource of a relatively long periodicity may be set to the primary cell. In a case where such setting is applied, if SR triggering is generated or there is a pending SR, although the terminal is deviated from coverage of a secondary cell through which the PUCCH is transmitted, the terminal may transmit the SR using an SR resource set to the primary cell. Accordingly, the terminal may not perform unnecessary PRACH transmission.

However, in a case where a PUCCH resource for the SR transmission is allocated to the secondary cell in the ninth method, if the terminal is deviated from the coverage of the secondary cell as described above, while the terminal receives setting of the PUCCH resource for the SR transmission from the primary cell through RRC reset, the terminal may not receive allocation of the PUCCH resource for the SR transmission. In this case, the terminal should transmit a PRACH to the primary cell to request an uplink resource. This may cause consumption of a transmission resource by performing a random access process, and a long delay may occur in order to receive allocation of the PUSCH resource.

In the meantime, in a case of the tenth method, a process of transmitting the SR by the terminal depends on an existing operation of the LTE standard.

The terminal may perform transmission with respect to a union of resources set to the primary cell and the secondary cell. That is, if the SR transmission is indicated from the upper layer, the terminal may transmit the SR in the fastest subframe among SR transmittable sub-frames set to the primary cell and the secondary cell. In this case, when both of the primary cell and the secondary cell include the PUCCH resource for SR transmission, it needs to be set through which serving cell the terminal transmits the SR to. In this case, a method of fixedly transmitting the SR through the primary cell or the secondary cell by the terminal and a method of setting an SR transmission cell through upper layer signaling by the base station may be considered.

3.2. PUCCH Power Control

If a method for transmitting the PUCCH through the secondary cell is applied, there is a need for power control for PUCCH transmission with respect to the secondary cell set as the PUCCH transmission cell as well as the primary cell. The following is a description of a closed-loop power control method according to a TPC command among PUCCH power control elements with respect to PUCCH power control of the secondary cell set as the PUCCH transmission cell. For convenience of description, a method for controlling PUCCH power will be described based on a PUCCH transmission cell setting scenario illustrated in FIG. 7.

3.2.1. Method (Hereinafter Referred to as 'Eleventh Method') of Using a 'TPC Command for PUCCH' Field of a Downlink DCI Format with Respect to the Secondary Cell Set as the PUCCH Transmission Cell to Control PUCCH Power of a Corresponding Secondary Cell In the eleventh method, the downlink DCI format may include DCI format 1/1A/1 B/1C/1 D/2/2A/2B/2C/2D.

According to the current LTE standard, a 'TPC command for PUCCH' field of the downlink DCI with respect to the secondary cell has been used for resource allocation of a PUCCH format 1 b with channel selection or a PUCCH format 3. However, as illustrated in FIG. 7, when the PUCCH transmission with respect to the serving cell(s) is performed only through PUCCH transmission cells C0 and C3 of PUCCH cell groups G1 and G2 to which a corresponding serving cell belongs, the secondary cell through which the PUCCH is transmitted does not require resource allocation for the PUCCH format 1b/3. Accordingly, in this case, the secondary cell through which the PUCCH is transmitted may control PUCCH power in the same manner as in a case of the primary cell using a 'TPC command for PUCCH' field of a DCI with respect thereto.

Figure 8:
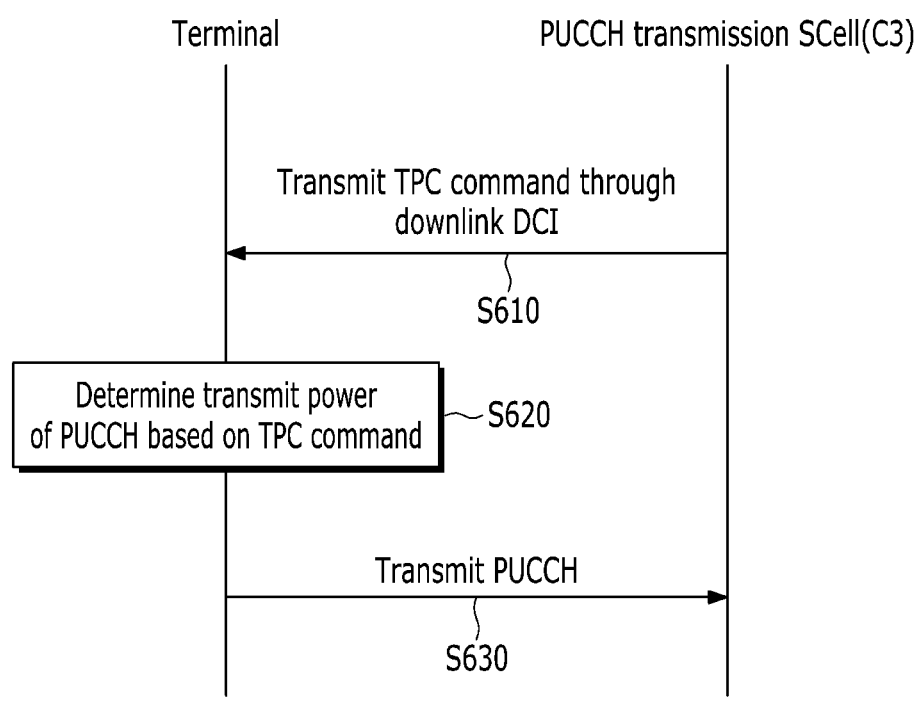
FIG. 8 is a diagram illustrating a method of controlling transmit power of a PUCCH through a downlink DCI format by the terminal and the serving cell set as the PUCCH transmission cell in accordance with an exemplary embodiment of the present invention.

FIG. 8 is a diagram illustrating a method of controlling transmit power of a PUCCH through a downlink DCI format by the terminal and the serving cell set as the PUCCH transmission cell in accordance with an exemplary embodiment of the present invention.

A secondary cell C3 set as a PUCCH transmission cell transmits a downlink DCI format (for example, DCI format 1/1A/1B/1D/2/2A/2B/2C/2D) including a TPC command ('TPC command for PUCCH') to a terminal (S610).

The terminal determines (controls) transmit power of a PUCCH based on the TPC command included in a received downlink DCI format (S620).

The terminal transmits the PUCCH to the secondary cell C3 of the terminal using the determined (controlled) transmit power (S630).

3.2.2. Method (Hereinafter Referred to as 'Twelfth Method') of Extending a Purpose of a DCI Format 3/3A or Inducing a DCI for a New Group Power Control to Use the Extended Purpose of a DCI Format 3/3A or the Induced DCI for PUCCH Power Control of the Secondary Cell In detail, in the twelfth method, a method of extending a purpose of the DCI format 3/3A (for example, a modified DCI format 3/3A including a CIF) to use the extended purpose of the DCI format 3/3A for PUCCH power control of the secondary cell is similar to the above second method. In this case, a CRC for the DCI format 3/3A is scrambled by TPC-PUCCH-RNTI.

Figure 9:
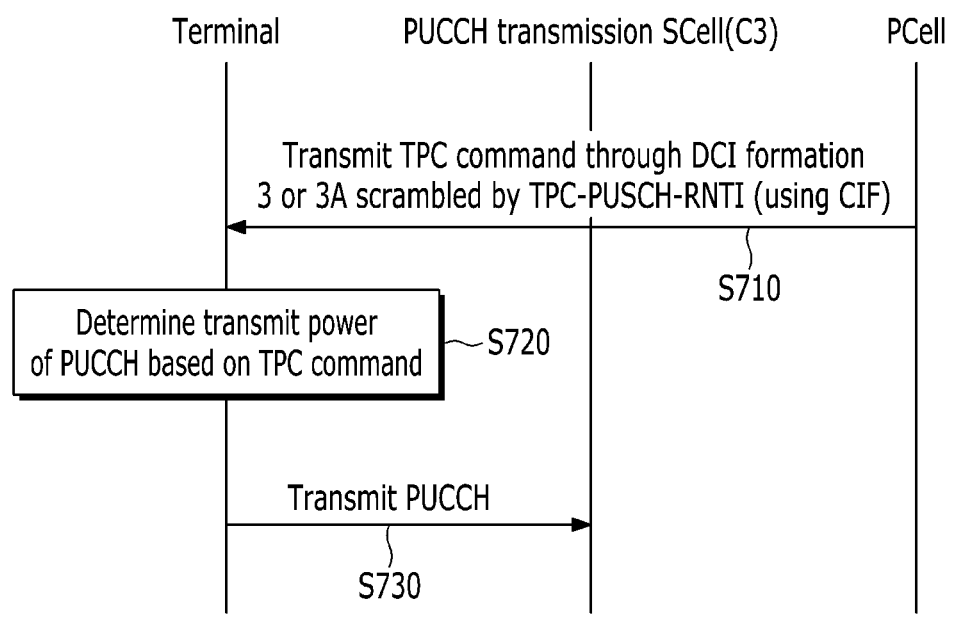
FIG. 9 is a diagram illustrating a method of controlling transmit power of a PUCCH with respect to a secondary cell set as a PUCCH transmission cell through a DCI format 3/3A including a CIF by the terminal and the primary cell in accordance with an exemplary embodiment of the present invention.

FIG. 9 is a diagram illustrating a method of controlling transmit power of a PUCCH with respect to a secondary cell C3 set as a PUCCH transmission cell through a DCI format 3/3A including a CIF by the terminal and the primary cell PCell in accordance with an exemplary embodiment of the present invention.

The primary cell PCell of the terminal transmits a modified DCI format 3/3A including a CIF and a plurality of TPC commands ('TPC command for PUCCH') to the terminal (S710). In this case, a CRS for the modified DCI format 3/3A is scrambled by TPC-PUCCH-RNTI.

The terminal determines (controls) transmit power of a PUCCH based on a TPC command for the terminal among a plurality of TPC commands included in a received DCI format 3/3A (S720). In detail, the terminal controls transmit power of the PUCCH with respect to a cell C3 indicated by a CIF of the received modified DCI format 3/3A.

The terminal transmits the PUCCH to a secondary cell C3 (indicated by the CIF) using the determined (controlled) power transmission (S730).

Meanwhile, in the twelfth method, a method of introducing a DCI for a new group power control (for example, DCI format 3B/3C, DCI format 5/5A) to the introduced DCI for a new group power control for PUCCH power control of the second cell is similar to the above third or fourth method.

3.2.3. Method (Hereinafter Referred to as 'Thirteenth Method') of Setting a Common Search Space in a PUCCH of a Secondary Cell Set as the PUCCH Transmission Cell to Transmit DCI Format 3/3a, Modified DCI Format 3/3a Including CIF, or DCI Format for New Group Power Control Through PDCCH Common Search Space of a Corresponding Second Cell In the thirteenth method, a method of transmitting a DCI format 3/3A through a PDCCH common search space of the secondary cell is similar to the above fifth method.

Further, in the thirteenth method, a method of transmitting a modified DCI format 3/3A including the CIF through the PDCCH common search space of the secondary cell is similar to the above sixth method.

In addition, in the thirteenth method, a method of transmitting a DCI format for new group power control (for example, DCI format 3B/3C, DCI format 5/5A) through a PDCCH common search space of the secondary cell is similar to the above seventh or eighth method.

In a case of the above SRS power control, a CRC for the DCI format 3/3A/3B/3C/5/5A is scrambled by TPC-PUSCH-RNTI. In contrast, in a case of the PUCCH power control (for example, the twelfth method or the thirteenth method), a CRC for the DCI format 3/3A/3B/3C/5/5A is scrambled by TPC-PUCCH-RNTI.

The eleventh to thirteenth methods may be simultaneously applied without conflicting with each other.

3.3. Power Allocation Priority

Hereinafter, PUCCH transmission of the terminal and a power allocation priority for the PUSCH transmission will be described when a plurality of PUCCH cell groups are set to the terminal in a carrier aggregation. For convenience of description, a power allocation priority based on a PUCCH transmission cell setting scenario illustrated in FIG. 7 will be described.

In a case where the terminal simultaneously performs uplink transmission to at least two serving cells in the same sub-frame, if a sum of transmit power required in the terminal exceeds allowable maximum transmit power $P_{cmax}$) the terminal should scale a transmit power value or discard transmission to a certain serving cell. A transmission priority between different channels/signals of the terminal in the carrier aggregation scenario defined in the current LTE standard depends on an order of PUSCH>SRS which does not include PUSCH>UCI including PRACH>PUCCH>UCI.

When the terminal simultaneously transmits the PUCCH through a primary cell C0 and the secondary cell C3, the above priority is equally applicable between different channels/signals. In this case, there is a need to define a priority between a PUCCH of the primary cell C0 and a PUCCH of the secondary cell C3. So as to determine a priority between transmission of two PUCCHs, the fourteenth to seventeenth method may be applied.

When the fourteenth method is applied, transmission of all PUCCHs has the same priority. When the fifteenth method is applied, PUCCH transmission through a primary cell C0 always has a higher priority than PUCCH transmission through a secondary cell C3. When the sixteenth method is applied, a priority is determined according to types (for example, SR, HARQ-ACK, periodic CSI) of a UCI included in the PUCCH. When a UCI included in a PUCCH of the primary cell C0 is the same as a UCI included in a PUCCH of the primary cell C3, transmission of the two PUCCHs has the same priority. When the seventeenth method is applied, a priority is determined according to types (for example, SR, HARQ-ACK, periodic CSI) of the UCI included in the PUCCH. When a UCI included in a PUCCH of the primary cell C0 is the same as a UCI included in a PUCCH of the primary cell C3, PUCCH transmission through the primary cell C0 has higher priority than that of PUCCH transmission through the primary cell C0.

Unlike a DC scenario, in a case of the carrier aggregation scenario, a UCI transmitted through the primary cell C0 and a UCI transmitted through the secondary cell C3 may be equal to each other or have a relatively similar importance. When considering this, as compared with a PUCCH of the primary cell C0 always having higher priority than that of a PUCCH of the secondary cell C3, as in the sixteenth or seventeenth method, it may be more preferable to determine the priority according to the UCI type. In this case, the UCI (for example, periodic CSI) transmitted through the PUSCH may be included in a method of determining the priority.

With respect to the sixteenth method and the seventeenth method, the priority between UCI types may depend on one of orders (first order to third order) listed in the following Table 13.

TABLE 13

| UCI priority | |
| --- | --- |
| First order | SR = HARQ-ACK (>aperiodic CSI) > periodic CSI |
| Second order | SR > HARQ-ACK (>aperiodic CSI) > periodic CSI |
| Third order | HARQ-ACK > SR (>aperiodic CSI) > periodic CSI |

Meanwhile, transmission of the PUCCH (for example, HARQ-ACK+SR, or HARQ-ACK+periodic CSI) including a plurality of UCI types may be set to have priority than that of transmission of the PUCCH including one UCI type. A PUCCH including HARQ-ACK+SR may be set to have higher priority than that of a PUCCH including HARQ-ACK+periodic CSI.

Meanwhile, when transmission of a PUCCH (or PUSCH) through a primary cell C0 has the same priority as that of transmission of a PUCCH (or PUSCH) through a primary cell C3, the terminal may transmit the two PUCCHs by reducing transmit power to the same ratio.

In contrast, when the transmission of a PUCCH (or PUSCH) through the primary cell C0 has a different priority from that of the transmission of a PUCCH (or PUSCH) through a primary cell C3, the terminal may firstly allocate power using the whole $P_{cmax}$ for transmission of a high priority, and may allocate power for transmission of a low priority using remaining power when there is remaining power among $P_{cmax}$. Alternatively, the terminal may transmit only PUCCHs with a higher priority and discard PUCCHs with a lower priority.

Figure 10:
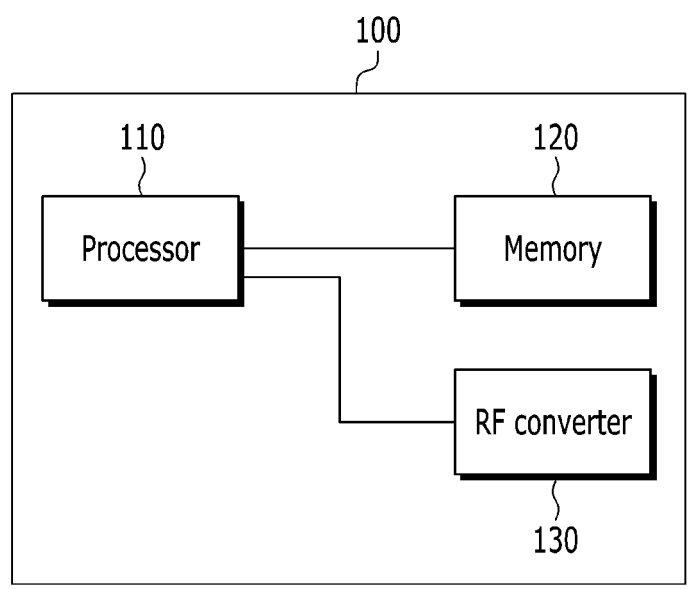
FIG. 10 is a block diagram illustrating a configuration of a terminal in accordance with an exemplary embodiment of the present invention.

FIG. 10 is a block diagram illustrating a configuration of a terminal 100 in accordance with an exemplary embodiment of the present invention.

The terminal 100 includes a processor 110, a memory 120, and a radio frequency (RF) converter 130.

The processor 110 may be configured to perform processes, functions, and methods associated with the above terminal in the specification.

The memory 120 is connected to the processor 110, and stores various information associated with an operation of the processor 110.

The RF converter 130 is connected to the processor 110, and sends and receives radio signals. Further, the terminal 100 may include a single antenna or multiple antennas.

Figure 11:
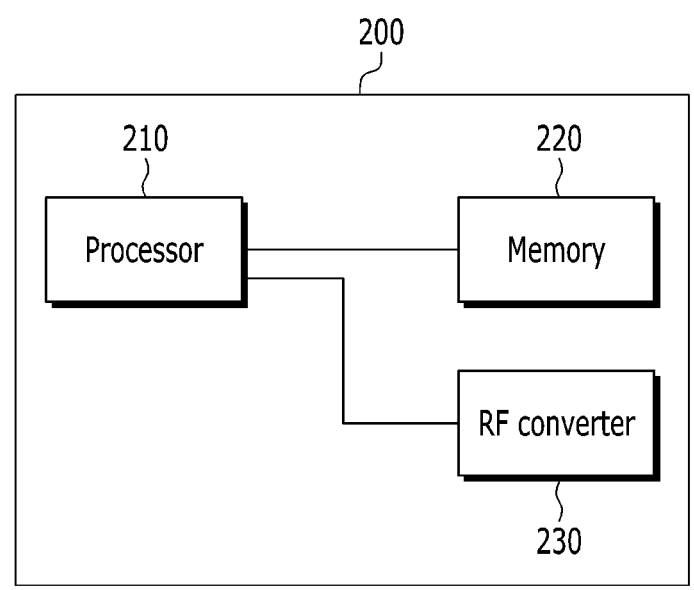
FIG. 11 is a block diagram illustrating a configuration of a base station in accordance with an exemplary embodiment of the present invention.

FIG. 11 is a block diagram illustrating a configuration of a base station 200 in accordance with an exemplary embodiment of the present invention. In detail, the base station 200 may include a base station to control (include) the above serving cell in the specification.

The base station 200 includes a processor 210, a memory 220, and a RF converter 230.

The processor 210 may be configured to perform processes, functions, and methods associated with the above serving cell in the specification.

The memory 220 is connected to the processor 210, and stores various information associated with an operation of the processor 210.

The RF converter 230 is connected to the processor 210, and sends and receives radio signals. Further, the base station 200 may include a single antenna or multiple antennas.

Some or all of the above first to thirteenth methods do not conflict with each other, and they are simultaneously applicable.

According to an embodiment of the present invention, the transmit power of an uplink signal such as an SRS and transmit power of an uplink channel such as PUCCH or PUSCH may be efficiently controlled in an LTE carrier aggregation system.

Further, in accordance with an exemplary embodiment of the present invention, power of a closed loop with respect to an SRS to be transmitted through a secondary cell may be controlled even if the terminal does not monitor DCI format 0/4.

Moreover, in accordance with an exemplary embodiment of the present invention, DCI overhead and an insufficient RNTI value of the primary cell to be generated due to the control of the uplink may be attenuated.

In addition, in accordance with an exemplary embodiment of the present invention, an insufficient PUCCH resource and PUCCH overhead of the primary cell may be attenuated by transmitting the PUCCH through the secondary cell as well as the primary cell by the terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a sounding reference signal (SRS) by a terminal in an environment in which a first carrier corresponding to a first serving cell and a second carrier corresponding to a second serving cell are aggregated, the method comprising:
   receiving first downlink control information (DCI) which is used for downlink scheduling and includes a first transmit power control (TPC) command through the first serving cell;
   controlling transmit power of the SRS based on the first TPC command for transmit power control of the SRS; and
   transmitting the SRS through the second serving cell using the controlled transmit power,
   wherein the controlling of the transmit power of the SRS comprises controlling the transmit power of the SRS based on the first TPC command of the first DCI received from at least a fourth downlink sub-frame before a first sub-frame in which the SRS is transmitted among sub-frames.

2. The method of claim 1, wherein the first DCI for downlink scheduling comprises all fields that one of a DCI format 1, a DCI format 1 A, a DCI format 1 B, a DCI format 1 D, a DCI format 2, a DCI format 2A, a DCI format 2B, a DCI format 2C, and a DCI format 2D has, and further comprises a field for the first TPC command having two bits.

3. The method of claim 1, wherein the second serving cell comprises a secondary cell using time division duplexing (TDD) for the terminal, and the first sub-frame comprises a downlink pilot time slot, a guard period, and an uplink pilot time slot, and has one of a 5 ms periodicity and a 10 ms periodicity.

4. The method of claim 1, wherein the controlling of the transmit power of the SRS further comprises controlling transmit power of the SRS using the most recently used power control value for the SRS when the terminal does not receive the first DCI from at least a fourth sub-frame before the first sub-frame.

5. A method for transmitting a sounding reference signal (SRS) by a terminal in an environment in which a first carrier corresponding to a first serving cell and a second carrier corresponding to a second serving cell are aggregated, the method comprising:
  receiving first downlink control information (DCI) which is used for downlink scheduling and includes a first transmit power control (TPC) command through the first serving cell;
  controlling transmit power of the SRS based on the first TPC command for transmit power control of the SRS; and
  transmitting the SRS through the second serving cell using the controlled transmit power,
  wherein the receiving of the first DCI comprises receiving the first DCI within a first sub-frame group defined for receiving the first DCI, and the controlling of the transmit power of the SRS comprises controlling the transmit power of the SRS based on the first TPC command of the first DCI which is lastly received among the first DCIs received within the first sub-frame group.

6. The method of claim 5, wherein the receiving of the first DCI comprises receiving the first DCI within a first sub-frame group defined for receiving the first DCI, and the controlling of the transmit power of the SRS further comprises:
  accumulating a power control value corresponding to the first TPC command of the first DCI received within the first sub-frame group, respectively; and
  controlling the transmit power of the SRS based on the accumulated power control value.

7. The method of claim 5, wherein the first DCI for downlink scheduling comprises all fields that one of a DCI format 1, a DCI format 1 A, a DCI format 1 B, a DCI format 1 D, a DCI format 2, a DCI format 2A, a DCI format 2B, a DCI format 2C, and a DCI format 2D has, and further comprises a field for the first TPC command having two bits.

8. The method of claim 5, wherein the controlling of the transmit power of the SRS further comprises controlling transmit power of the SRS using the most recently used power control value for the SRS when the terminal does not receive the first DCI within the first sub-frame group.

9. A method for transmitting a sounding reference signal (SRS) by a terminal in an environment in which a first carrier corresponding to a first serving cell and a second carrier corresponding to a second serving cell are aggregated, the method comprising:
  receiving first downlink control information (DCI) which is used for downlink scheduling and includes a first transmit power control (TPC) command through the first serving cell;
  controlling transmit power of the SRS based on the first TPC command for transmit power control of the SRS;
  transmitting the SRS through the second serving cell using the controlled transmit power;
  receiving second DCI for uplink TPC, which includes a plurality of second TPC commands and a carrier indicator (CI) indicating a cell to which the second TPC command is applied, through the first serving cell serving as a primary cell for the terminal;
  determining a third TPC command for the terminal among the plurality of second TPC commands included in the second DCI; and
  controlling the transmit power of the SRS to be transmitted through the second serving cell based on the third TPC command when the CI included in the second DCI indicates the second serving cell which is a secondary cell for the terminal.

10. The method of claim 9, wherein the third TPC command is one of 2 bits and 1 bit, and the CI is 3 bits and is located before the plurality of second TPC commands.

11. The method of claim 9, wherein the CI is located after the plurality of second TPC commands.

12. The method of claim 9, wherein a payload size of the second DCI is equal to a payload size of one of a DCI format 3 and a DCI format 3A.

13. The method of claim 9, wherein the receiving of the second DCI comprises receiving the second DCI through a first common search space (CSS) for the first serving cell, and a number of control channel elements (CCE) that the first CSS occupies is greater than 16 and is a multiple of 4 or 8.

14. The method of claim 9, wherein a payload size of the second DCI is equal to a payload size of a DCI format 1C.

15. The method of claim 14, wherein the receiving of the second DCI comprises receiving the second DCI through a first common search space (CSS) for the first serving cell, and an aggregation level for the first CSS is 2.

16. The method of claim 9, further comprising:
  receiving a third DCI for uplink TPC through a first common search space (CSS) configured to a physical downlink control channel (PDCCH) of the second serving cell; and
  controlling the transmit power of the SRS to be transmitted through the second serving cell based on a fifth TPC command for the terminal among a plurality of fourth TPC commands included in the third DCI.

17. The method of claim 16, wherein a number of control channel elements (CCE) for the first CSS is 8, and the number of PDCCH candidates for the first CSS is 2 when an aggregation level is 4, while a number of PDCCH candidates for the first CSS is 1 when the aggregation level is 8.

* * * * *